United States Patent
Mori

(10) Patent No.: US 8,666,416 B2
(45) Date of Patent: Mar. 4, 2014

(54) MOBILE COMMUNICATION SYSTEM AND BASE STATION APPARATUS

(75) Inventor: Masaru Mori, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/446,339

(22) Filed: Apr. 13, 2012

(65) Prior Publication Data

US 2012/0202556 A1    Aug. 9, 2012

Related U.S. Application Data

(63) Continuation of application No. PCT/JP2009/070492, filed on Dec. 7, 2009.

(51) Int. Cl.
  *H04Q 7/20* (2006.01)

(52) U.S. Cl.
  USPC ........... 455/436; 455/437; 455/438; 455/439; 455/440; 455/441; 445/443; 445/442; 445/445; 445/446

(58) Field of Classification Search
  USPC .................................. 455/436–439, 442–443
  See application file for complete search history.

(56) References Cited

U.S. PATENT DOCUMENTS

| | | | |
|---|---|---|---|
| 6,608,823 B1* | 8/2003 | Kito .............................. | 370/331 |
| 7,310,323 B2 | 12/2007 | Maillard et al. | |
| 7,656,841 B2 | 2/2010 | Brouet et al. | |
| 2002/0105913 A1 | 8/2002 | Miya | |
| 2005/0281218 A1 | 12/2005 | Maillard et al. | |
| 2006/0029022 A1 | 2/2006 | Brouet et al. | |
| 2008/0176566 A1 | 7/2008 | Akita | |

FOREIGN PATENT DOCUMENTS

| | | |
|---|---|---|
| JP | 2001-231069 | 8/2001 |
| JP | 2001-358644 | 12/2001 |
| JP | 2001-359136 | 12/2001 |
| JP | 2006-33818 | 2/2006 |
| JP | 2006-74741 | 3/2006 |
| JP | 2008-42764 | 2/2008 |
| JP | 2008-103865 | 5/2008 |
| JP | 2008-211497 | 9/2008 |
| WO | 2008/096418 | 8/2008 |

OTHER PUBLICATIONS

International Search Report dated Feb. 16, 2010, from corresponding International Application No. PCT/JP2009/070492.
Motorola "Long Term Evolution (LTE): A Technical Overview" 2008.
Tae-Hyong Kim, et al. "A Mobility Management Technique with Simple Handover Prediction for 3G LTE Systems" IEEE, 2007, pp. 259-263.

* cited by examiner

*Primary Examiner* — Olumide T Ajibade Akonai
*Assistant Examiner* — Randy Peaches
(74) *Attorney, Agent, or Firm* — Katten Muchin Rosenman LLP

(57) ABSTRACT

A mobile communication system includes a plurality of base station apparatuses and a mobile station apparatus. The mobile station apparatus measures at predetermined intervals of time the quality of a signal received from each base station apparatus and transmits signal reception quality information indicating the quality of the signal to a first base station apparatus that is currently connected via radio to the mobile station apparatus. After a predetermined period of time has elapsed from the time that the signal reception quality for the first base station apparatus dropped to or below a first handover threshold, if the quality of the signal received from a second base station apparatus becomes equal to or higher than a second handover threshold, the first base station apparatus executes a handover to switch the radio connection of the mobile station apparatus from the first base station apparatus to the second base station apparatus.

8 Claims, 18 Drawing Sheets

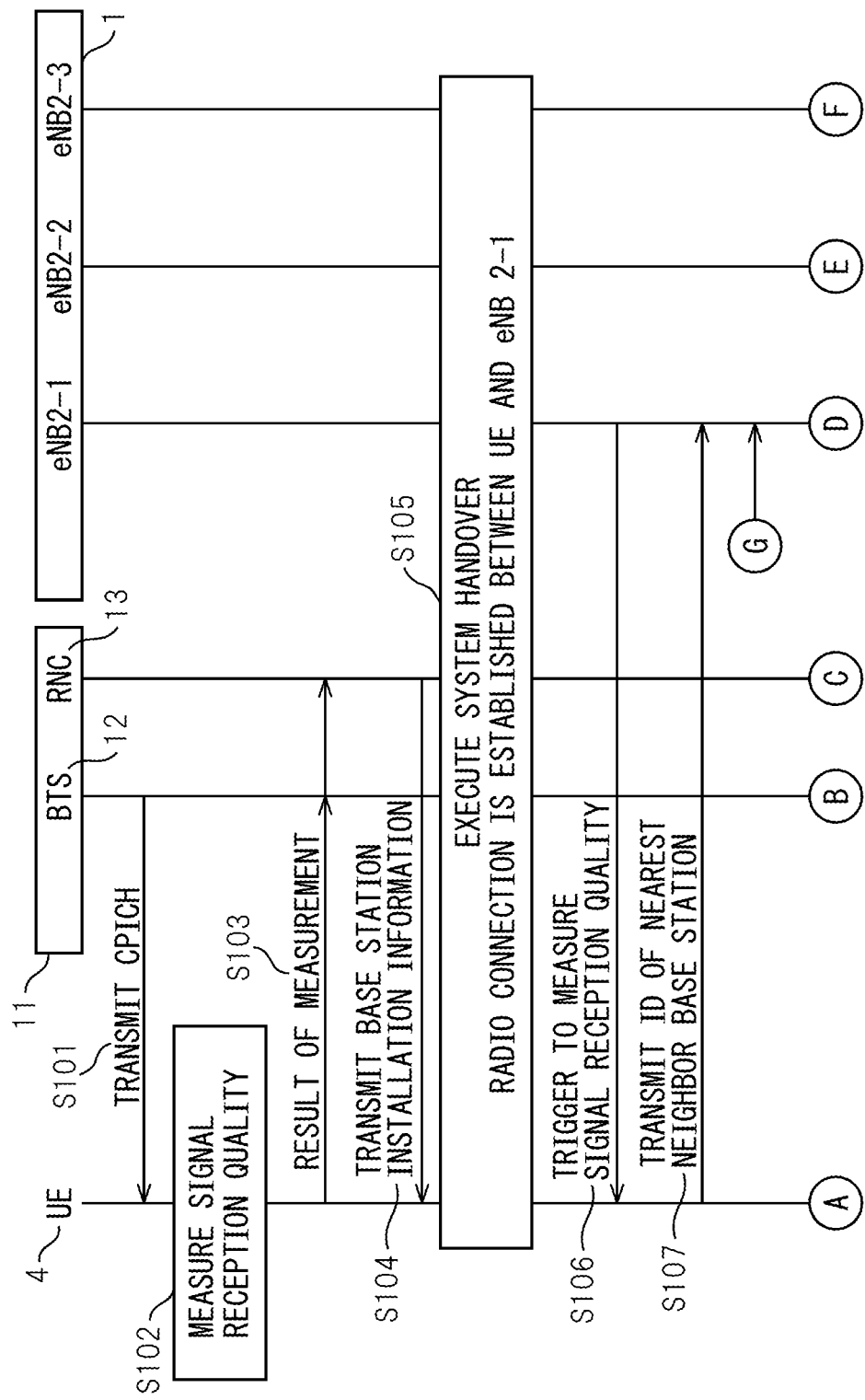

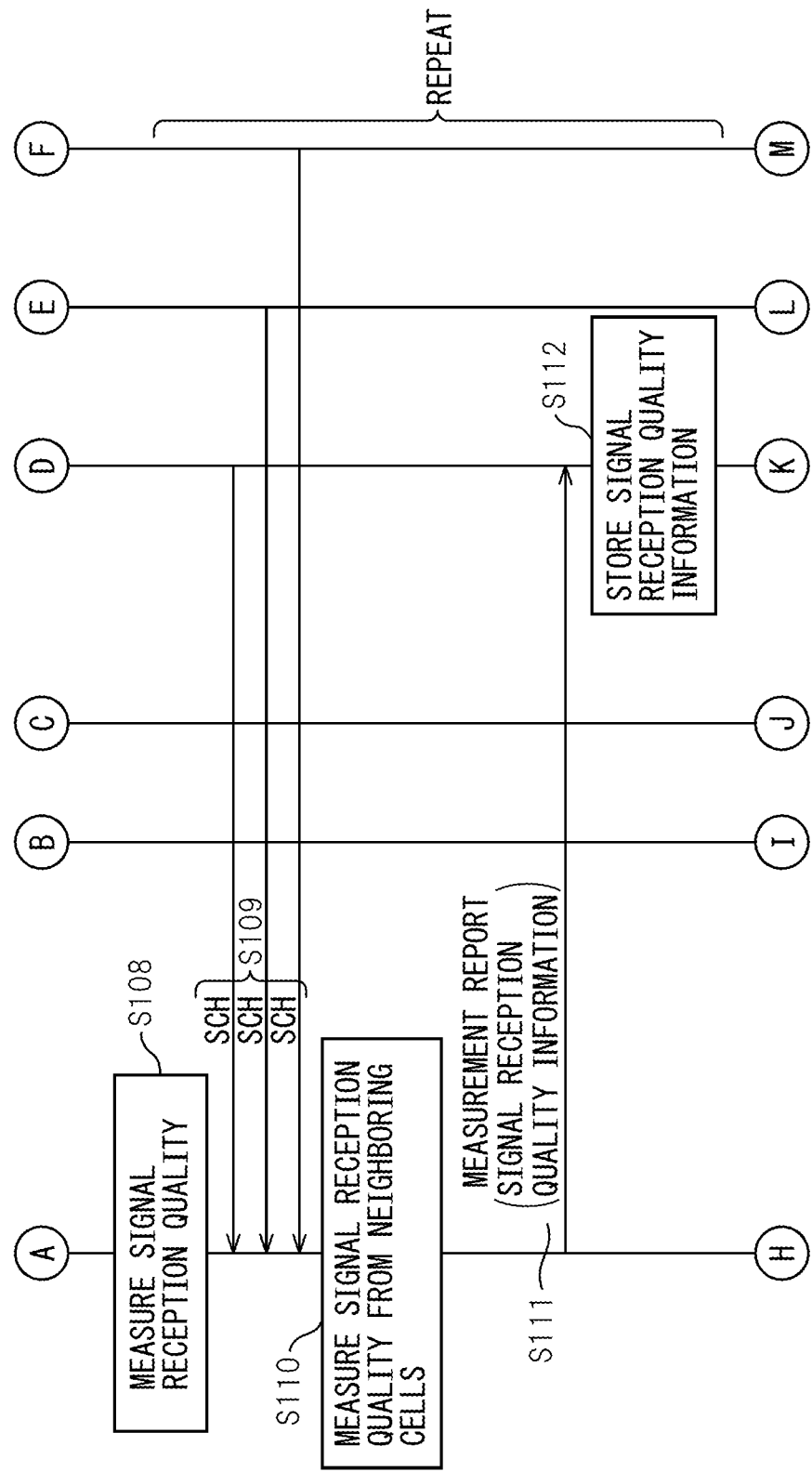

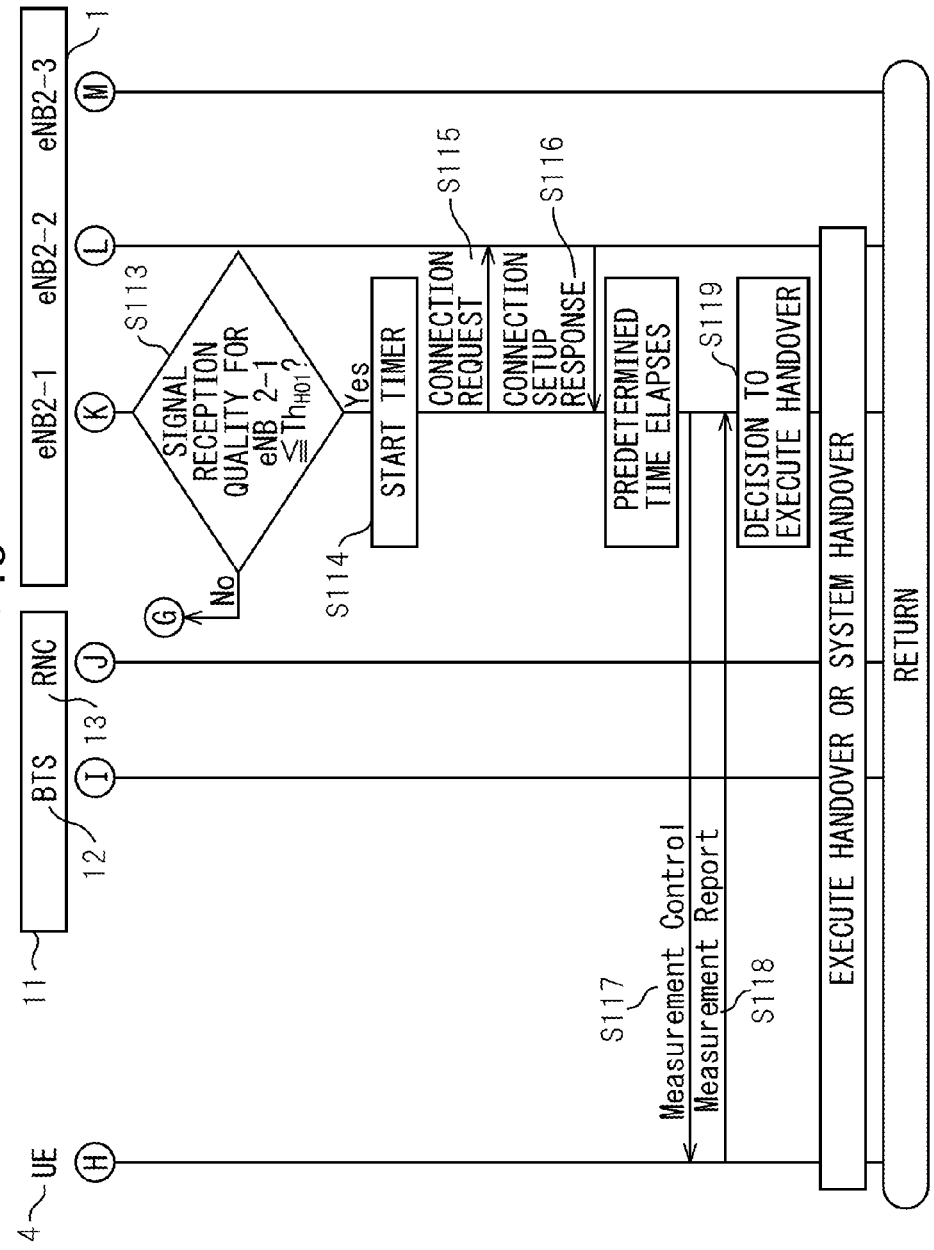

FIG.6

| BASE STATION ID /601 | CELL ID /602 | CARRIER FREQUENCY ID /603 | NEAREST NEIGHBOR BASE STATION ID /604 |
|---|---|---|---|
| BS01 | C01 | F01 | BS02 |
| BS02 | C01 | F02 | BS01 |
| BS03 | C02 | F03 | BS01 |
| ⋮ | ⋮ | ⋮ | |

↖600

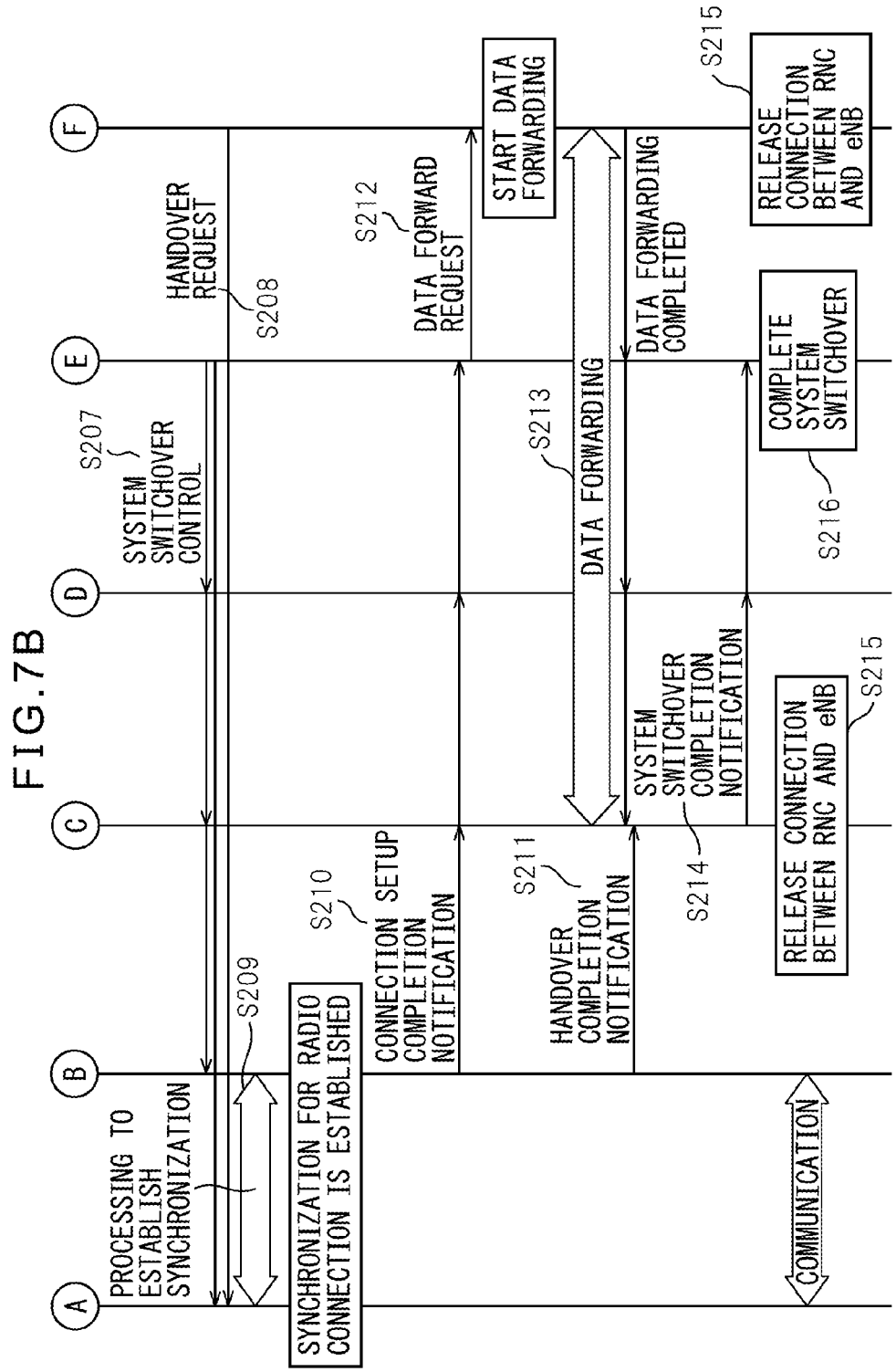

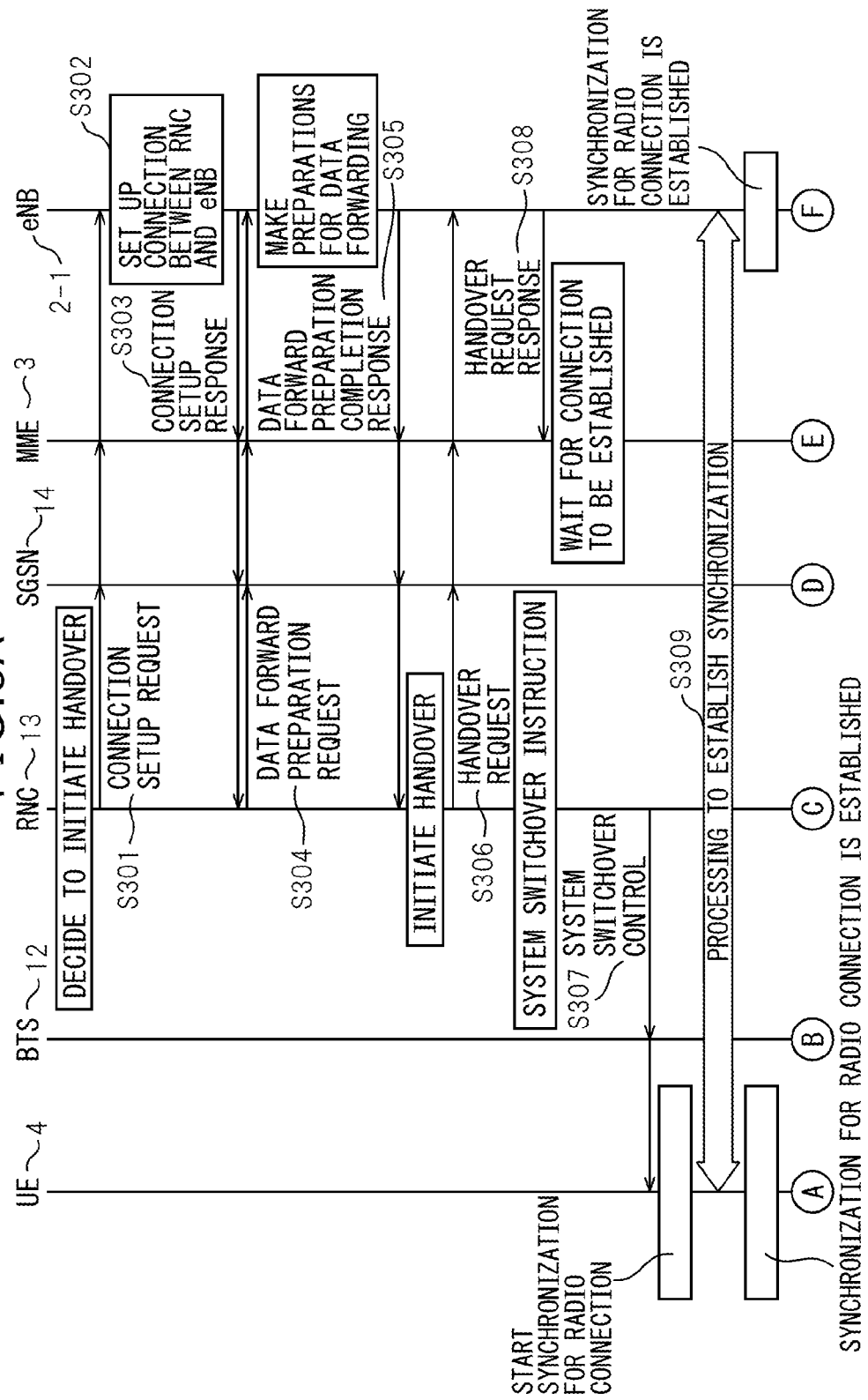

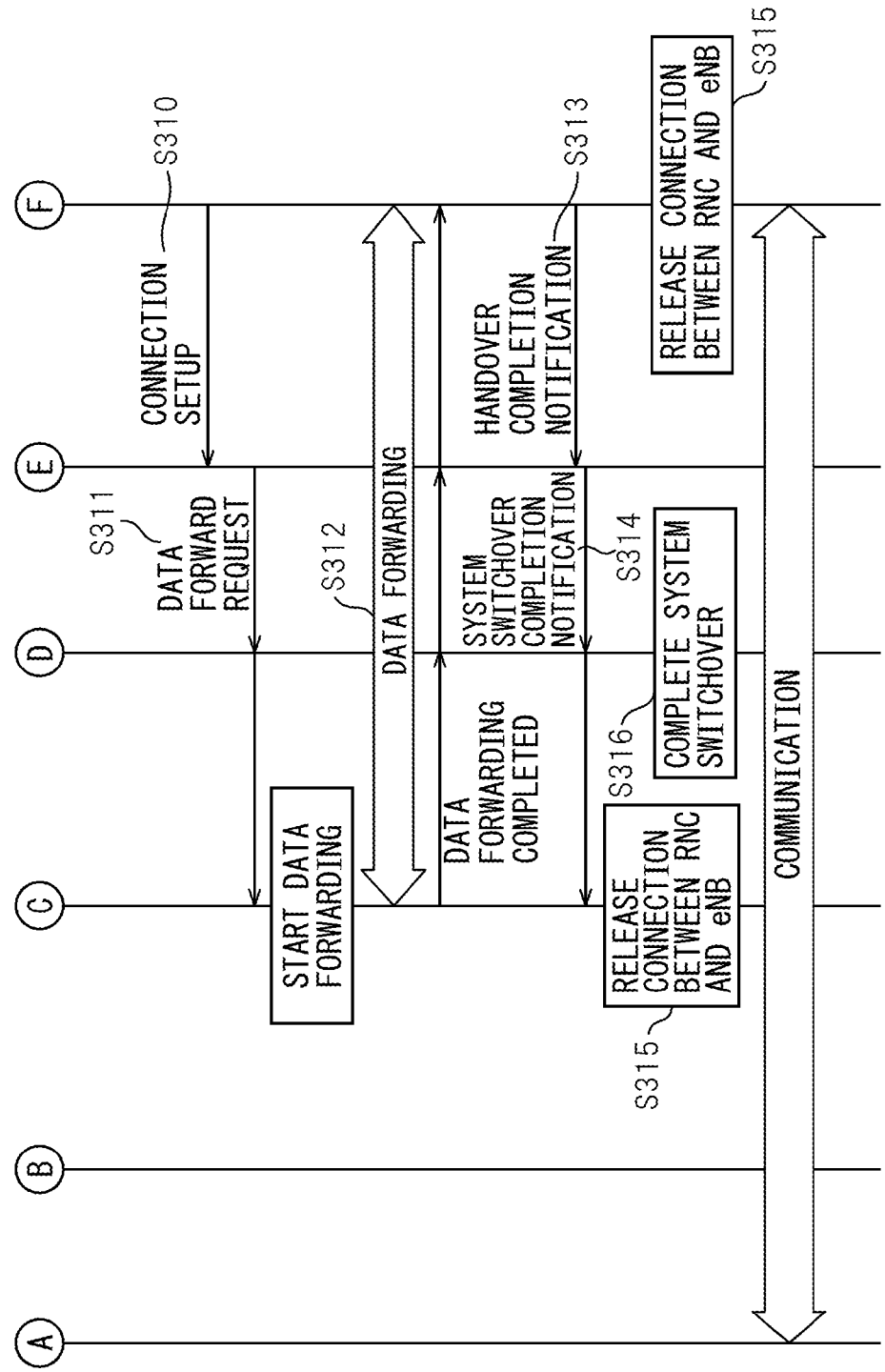

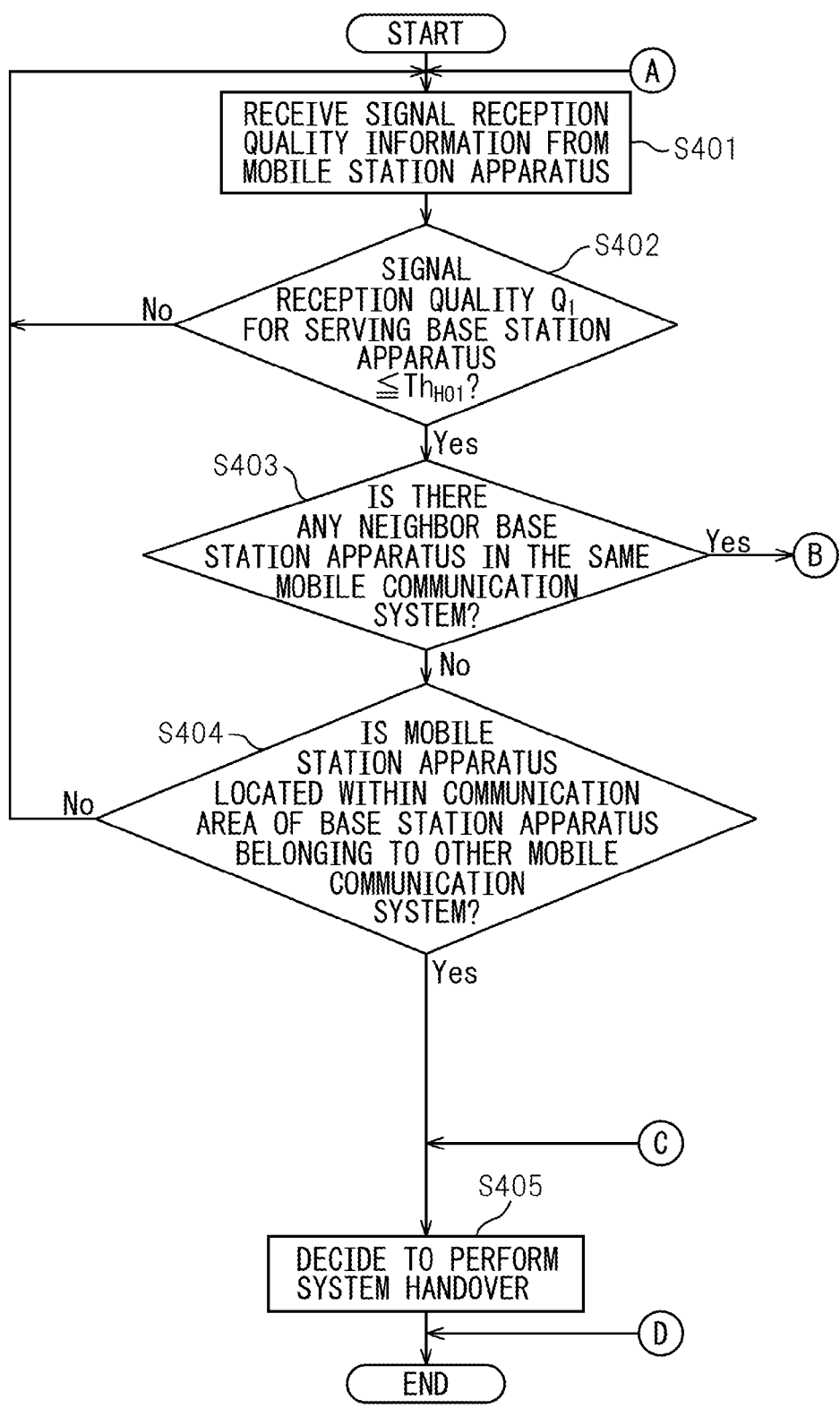

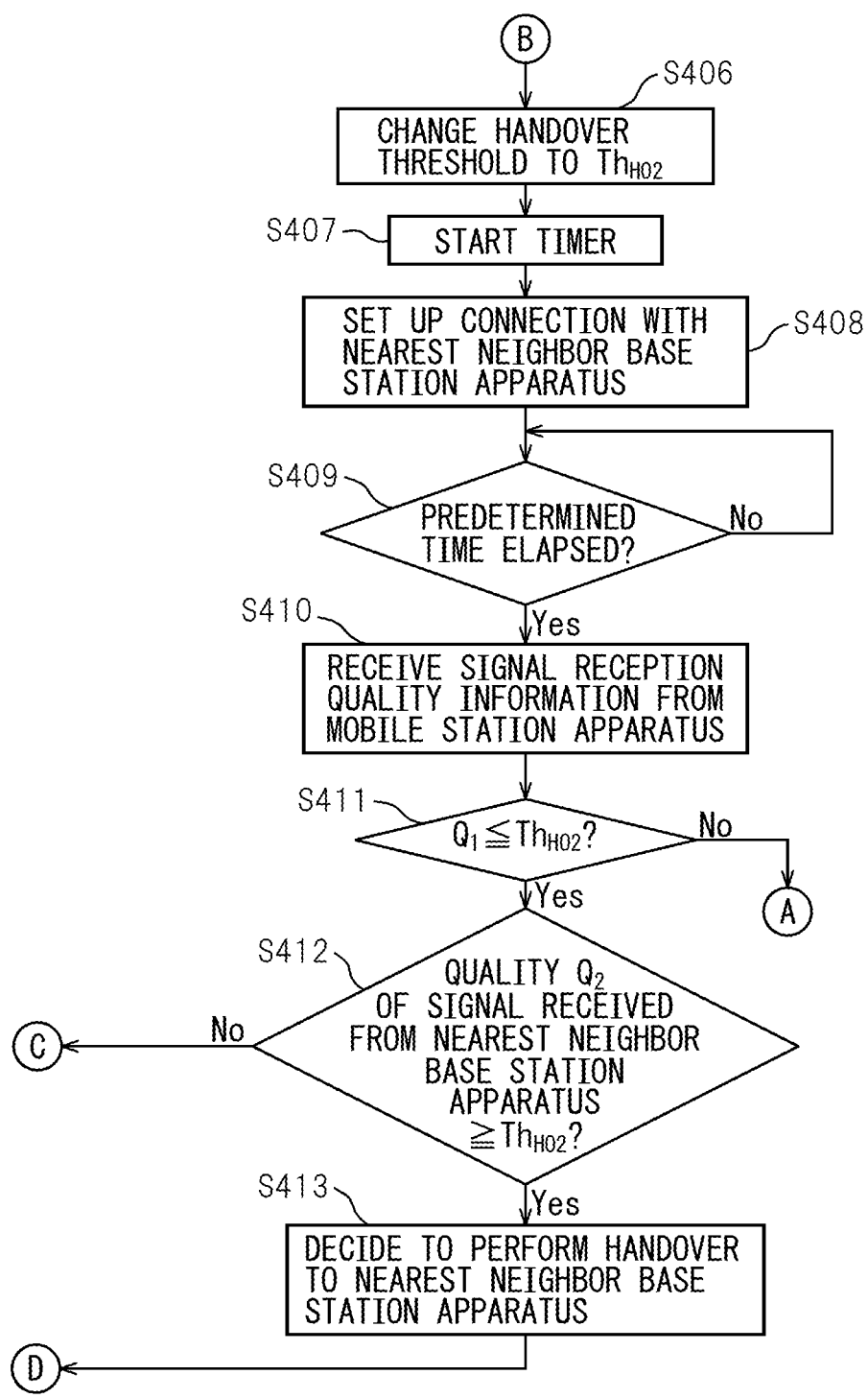

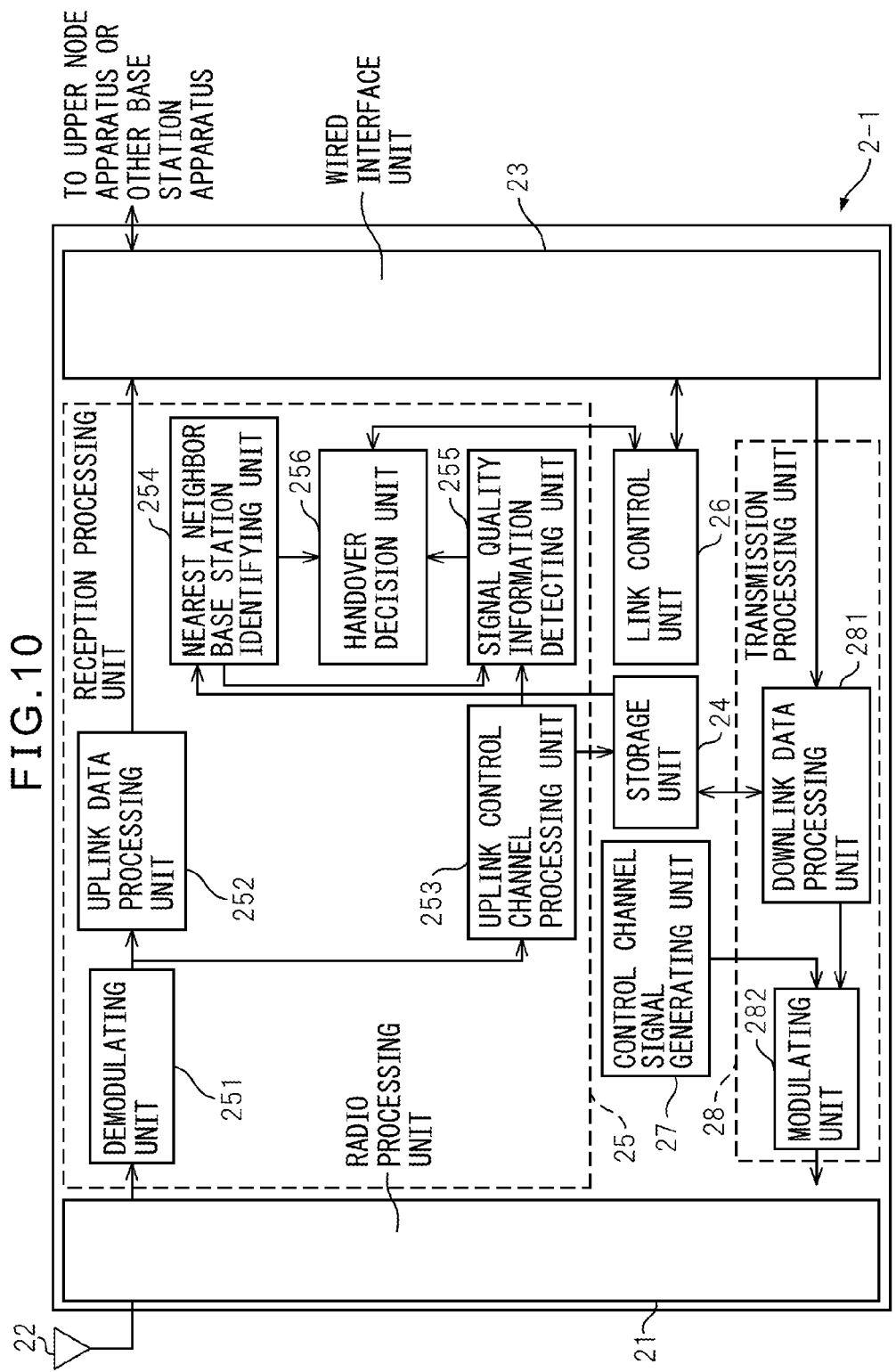

MOBILE COMMUNICATION SYSTEM AND BASE STATION APPARATUS

CROSS-REFERENCE TO RELATED APPLICATION

This application is a continuation application and is based upon PCT/JP2009/70492, filed on Dec. 7, 2009, the entire contents of which are incorporated herein by reference.

FIELD

The embodiments discussed herein are related to a mobile communication system, a base station apparatus, and a handover execution method.

BACKGROUND

In the field of mobile communication systems, the need for higher data transmission speeds is increasing. To address such a need, work on communication standards achieving higher communication speeds than High Speed Packet Access (HSPA) has been proceeding. One example of communication standards capable of achieving such high-speed data communications is the Long Term Evolution (LTE) on which the Third Generation Partnership Project (3GPP) is working for standardization.

In LTE, some of the functions conventionally incorporated in a radio network controller (RNC) are incorporated in a base station apparatus (Evolved Universal Terrestrial Radio Access Network (E-UTRAN) NodeB (eNB)) thereby greatly enhancing the functionality of the base station apparatus. For example, when executing a handover, there can occur cases where the downlink signal buffered in the source base station apparatus (hereinafter called the eNB1) to which the mobile station apparatus as a user terminal is radio linked before the execution of the handover has not yet been transmitted to the mobile station apparatus. In such cases, the eNB1 transfers the yet-to-be-transmitted downlink signal to the target base station apparatus (hereinafter called the eNB2) to which the mobile station apparatus is to be linked after the execution of the handover. The handover scheme in which the downlink signal is transferred between the eNBs provides that the time taken to transfer the data between the eNBs be sufficiently shorter than the time taken from the moment that the eNB1 issues a handover instruction to the mobile station apparatus to the moment that synchronization is established between the eNB2 and the mobile station apparatus. The reason is that, if the time taken to transfer the data between the eNBs is sufficiently shorter, it is thought that the downlink signal transmitted to the mobile station apparatus will not be lost in part or in its entirety or that no transmission delay will occur to the downlink signal.

On the other hand, handover procedures have been proposed that are based on the LTE handover procedure and that aim to reduce data losses and delays (for example, refer to Japanese Laid-open Patent Publication No. 2008-103865). In one example of such handover procedures, the LTE handover procedure is supplemented by a handover procedure to be used when higher quality is needed, and in the case of communications demanding a high QoS (Quality of Service) class, the high quality handover procedure is used. In this handover procedure, data transfer between the eNBs is not performed, but data is transmitted from an upper node apparatus to the source and target eNBs that serve the mobile station apparatus before and after the handover, respectively.

SUMMARY

During the transition period before the widespread deployment of LTE, it is anticipated that new mobile communication systems compliant to LTE will be allowed to coexist with existing mobile communication systems compliant to International Mobile Telecommunications 2000 (IMT-2000) or HSPA. As a result, during the transition period to the full deployment of LTE-compliant mobile communication systems, there are areas that are not covered by the communication areas of eNBs deployed as LTE-compliant base station apparatuses. In such areas, any mobile base station apparatus communicates via a base station apparatus in the existing mobile communication system. In this case, if a mobile station apparatus linked via radio to an eNB moves outside the communication area of the eNB, a system handover will be initiated between the two dissimilar mobile communication systems. When handing over between the LTE-compliant mobile communication system and the IMT-2000 compliant mobile communication system, a user plane interface is set up between an IMT-2000 Serving GPRS Support Node (SGSN) and an LTE User Plane Entity (UPE). Such a user plane interface is set up using, for example, General Packet Radio Service (GPRS) Tunneling Protocol for user plane (GTP-U). When the interface between UPE and SGSN is thus set up, the downlink data buffered in the eNB is transferred via UPE/SGSN to an RNC in the IMT-2000 compliant mobile communication system. Then, when the downlink data transfer is completed, and the link between UPE and SGSN is disconnected, the handover procedure is terminated.

As described above, in the event of a system handover, the downlink data is transferred by passing through a number of apparatuses. This may cause a delay in the delivery of the downlink data to the mobile station apparatus. Especially, in LTE, installing base station apparatuses having communication areas of up to tens of meters in radius is being considered. Such base station apparatuses are called femto base station apparatuses. Since the communication area of each femto base station apparatus is small as described, if a plurality of femto base station apparatuses are installed proximate to each other, the communication areas of the femto base station apparatuses may not overlap each other. If many such femto base station apparatuses are interspersed within the communication area of a base station apparatus belonging to the existing mobile communication system, a system handover will occur frequently since the mobile station apparatus repeatedly moves in and out of the communication area of it serving femto base station apparatus. As the frequency of occurrence of the system handover increases, the possibility of a delay occurring in the delivery of the downlink signal to the mobile station apparatus and the possibility of a loss of the downlink data become correspondingly greater. Furthermore, the higher the frequency of the system handover, the more likely it is that the purpose of reducing the time taken to connect the mobile station apparatus to a new base station apparatus in a handover situation, an advantage offered by LTE, will be defeated.

According to one embodiment, a mobile communication system is provided. The mobile communication system includes an upper node apparatus, a plurality of base station apparatuses connected to the upper node apparatus, and a mobile station apparatus capable of connecting via radio to any one of the plurality of base station apparatuses.

The mobile station apparatus measures at predetermined intervals of time the quality of a signal received from each of the plurality of base station apparatuses and, each time the quality of the received signal is measured, transmits signal reception quality information indicating the quality of the signal received from each base station apparatus to a first one of the plurality of base station apparatuses that is currently connected via radio to the mobile station apparatus.

Then, after a predetermined period of time has elapsed from the time at which the signal reception quality for the first base station apparatus dropped to or below a first handover threshold, if the quality of the signal received from a second one of the plurality of base station apparatuses that is different from the first base station apparatus becomes equal to or higher than a second handover threshold, the first base station apparatus executes a handover to switch the radio connection of the mobile station apparatus from the first base station apparatus to the second base station apparatus.

According to another embodiment, a handover execution method for use in a mobile communication system that includes an upper node apparatus, a plurality of base station apparatuses connected to the upper node apparatus, and a mobile station apparatus capable of connecting via radio to any one of the plurality of base station apparatuses is provided. In the handover execution method, the mobile station apparatus measures at predetermined intervals of time the quality of a signal received from each of the plurality of base station apparatuses and, each time the quality of the received signal is measured, transmits signal reception quality information indicating the quality of the signal received from each base station apparatus to a first one of the plurality of base station apparatuses that is currently connected via radio to the mobile station apparatus. On the other hand, the first base station apparatus compares the signal reception quality for first base station apparatus with a first handover threshold; measures a period of time that elapses after the signal reception quality for first base station apparatus has dropped to or below the first handover threshold; after a predetermined period of time has elapsed, compares the quality of the signal received from a second one of the plurality of base station apparatuses that is different from the first base station apparatus with a second handover threshold; and if the signal reception quality for second base station apparatus is equal to or higher than the second handover threshold, then executes a handover to switch the radio connection of the mobile station apparatus from the first base station apparatus to the second base station apparatus.

According to still another embodiment, a base station apparatus capable of connecting via radio to a mobile station apparatus is provided. The base station apparatus includes: a radio processing unit which receives from the mobile station apparatus, at predetermined intervals of time, signal reception quality information indicating the quality of signals that the mobile station apparatus received from the base station apparatus and another base station apparatus, respectively; and a handover decision unit which compares a first signal reception quality carried in the signal reception quality information for the base station apparatus with a first handover threshold and which, after a predetermined period of time has elapsed from the time at which the first signal reception quality dropped to or below the first handover threshold, if a second signal reception quality for the other base station apparatus becomes equal to or higher than the second handover threshold, then decides to switch the radio connection of the mobile station apparatus from the base station apparatus to the other base station apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B shows an operation sequence diagram illustrating a handover process performed in the mobile communication system according to the one embodiment.

FIG. 5 is an operation sequence diagram illustrating a handover process performed in the mobile communication system according to the one embodiment.

FIG. 6 is a diagram illustrating one example of base station installation information.

FIGS. 7A and 7B shows an operation sequence diagram illustrating a procedure for a system handover from the mobile communication system according to the one embodiment to a dissimilar mobile communication system.

FIGS. 8A and 8B shows an operation sequence diagram illustrating a procedure for a system handover from the dissimilar mobile communication system to the mobile communication system according to the one embodiment.

FIGS. 9A and 9B shows an operation flowchart illustrating a handover execution decision procedure which is performed at the base station apparatus in the mobile communication system according to the one embodiment.

FIG. 10 is a diagram schematically illustrating the configuration of the base station apparatus in the mobile communication system according to the one embodiment.

DESCRIPTION OF EMBODIMENTS

A mobile communication system according to one embodiment will be described below with reference to the drawings.

This mobile communication system is connected to another mobile communication system via a core network. When a mobile station apparatus moves outside the communication area of a base station apparatus belonging to this mobile communication system and enters the communication area of a base station apparatus belonging to that other mobile communication system, a system handover occurs. When the mobile station apparatus leaves the communication area of the base station apparatus in that other mobile communication system and reenters the communication area of the base station apparatus in this mobile communication system, a system handover occurs once again.

In view of this, in this mobile communication system, if the quality of the received signal at the mobile station apparatus satisfies a condition for initiating a handover, the base station apparatus to which the mobile station apparatus is radio linked does not immediately initiate the handover. Instead, after the condition is satisfied, the base station apparatus waits for a predetermined period of time to elapse, and then makes a decision as to whether or not to execute the handover. The mobile communication system thus prevents overly frequent occurrence of a system handover.

Figure 1:
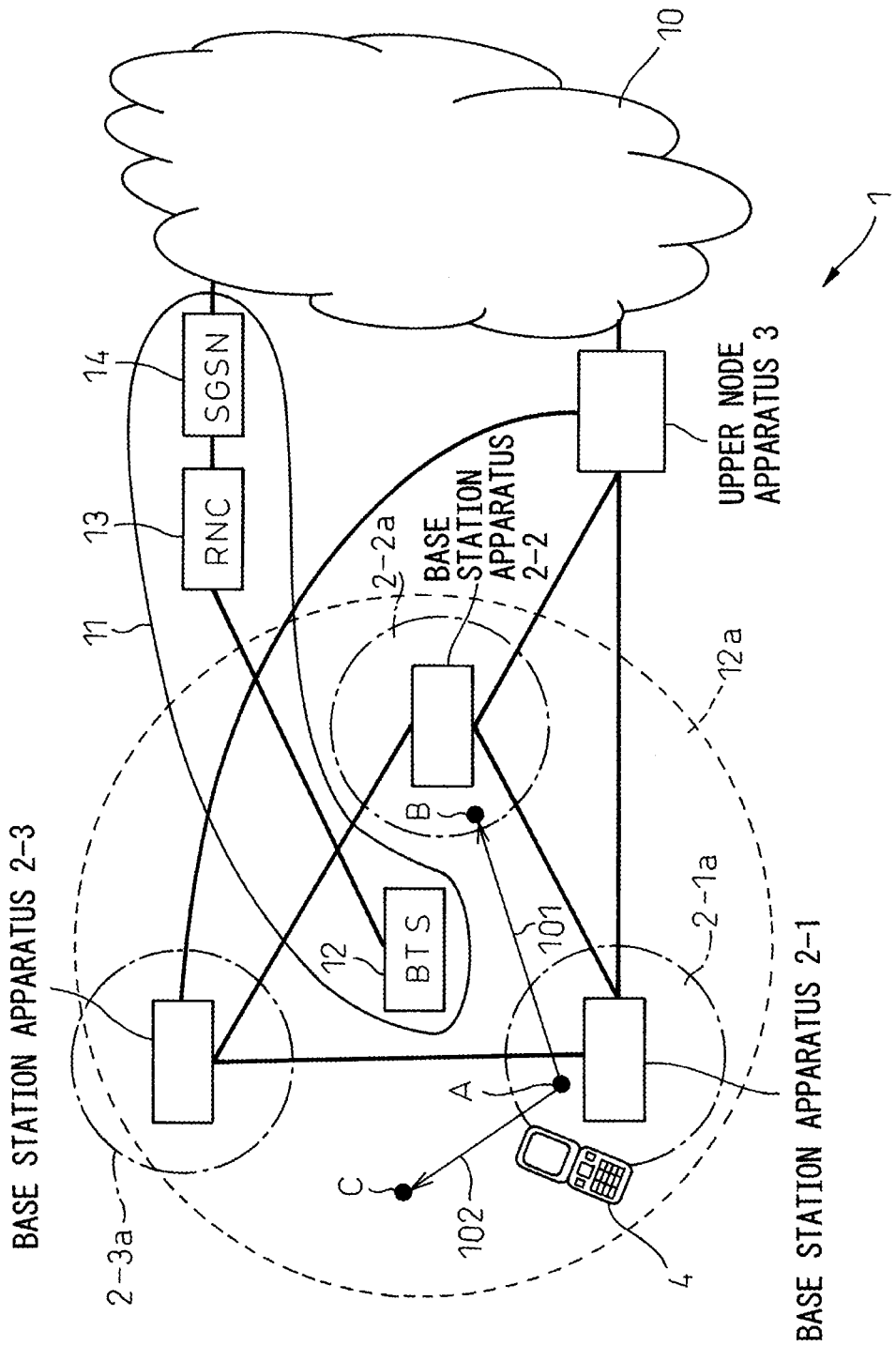
FIG. 1 is a diagram schematically illustrating the configuration of a mobile communication system according to one embodiment.

FIG. 1 is a diagram schematically illustrating the configuration of the mobile communication system according to the one embodiment. The mobile communication system 1 includes three base station apparatuses 2-1 to 2-3, an upper node apparatus 3, and a mobile station apparatus 4. The base station apparatuses 2-1 to 2-3 are each connected to the upper node apparatus 3 over a communication network. As an example, in FIG. 1, the mobile communication system 1 includes three base station apparatuses. However, the number of base station apparatuses included in the mobile communication system 1 is not limited to three. The mobile communication system 1 need only include more than one base station apparatus. Further, the number of mobile station apparatuses included in the mobile communication system 1 is not limited to one.

The upper node apparatus 3 is connected via a core network 10 to a serving GPRS support node (SGSN) 14 in another mobile communication system 11. This other mobile communication system 11 includes a radio network controller (RNC) 13 connected to the SGSN 14 and at least one base station apparatus 12 connected to the RNC 13.

The mobile communication system 1 may be a mobile communication system, for example, an LTE-compliant system, in which data can be transferred between the base station apparatuses.

The base station apparatuses 2-1 to 2-3 are apparatuses that relay communications between the mobile station apparatus 4 and the upper node apparatus 3. The base station apparatuses 2-1 to 2-3 each correspond, for example, to an eNB in LTE.

The upper node apparatus 3 is an apparatus that relays communications between the mobile station apparatus 4 and the core network. The upper node apparatus 3 corresponds, for example, to a user plane entity (UPE) in LTE. The upper node apparatus 3 may include the function of Mobility Management Entity (MME), or may include an apparatus having the function of UPE and an apparatus having the function of MME as separate entities.

The other mobile communication system 11 is a mobile communication system in which data from any of the base station apparatuses in the mobile communication system 1 is unable to be transferred directly to the base station apparatus 12. This other mobile communication system 11 is, for example, a system compliant with IMT-2000 or HSPA.

When the mobile station apparatus 4 enters any one of the communication areas 2-1a to 2-3a of the base station apparatuses 2-1 to 2-3, the mobile station apparatus 4 can communicate via radio with the base station apparatus serving that communication area. When a radio link is established between the mobile station apparatus 4 and the serving base station apparatus, uplink data transmitted from the mobile station apparatus 4 is relayed via the base station apparatus on to the upper node apparatus 3. The upper node apparatus 3 performs routing and transmits the received uplink data, for example, over the core network 10, to another upper node apparatus (not depicted). On the other hand, when downlink data is received from that other upper node apparatus over the core network 10, the upper node apparatus 3 transmits the received downlink data to the mobile station apparatus 4 via the base station apparatus to which the mobile station apparatus 4 is linked via radio.

In the present embodiment, the communication areas 2-1a to 2-3a of the base station apparatuses 2-1 to 2-3 do not overlap each other. However, the communication areas 2-1a to 2-3a overlap the communication area 12a of the base station apparatus 12. As a result, when the mobile station apparatus 4 moves from one of the communication areas of the base station apparatuses 2-1 to 2-3 to another one of the communication areas of the base station apparatuses 2-1 to 2-3, the mobile station apparatus 4 temporarily moves outside the area served by the mobile communication system 1. In the present embodiment, when the mobile station apparatus 4 moves outside one of the communication areas of the base station apparatuses 2-1 to 2-3, if the quality of the signal received from the serving base station apparatus drops to or below a threshold for initiating a handover, the mobile communication system 1 does not immediately initiate the handover, but waits for a predetermined period of time to elapse and then makes a decision as to whether or not to execute the handover.

For example, suppose that the mobile station apparatus 4 is initially located at point A within the communication area 2-1a of the base station apparatus 2-1 and is thus linked via radio to the base station apparatus 2-1. In this case, the downlink data is transmitted from the upper node apparatus 3 to the base station apparatus 2-1 and is buffered at the base station apparatus 2-1. Then, the downlink data is transmitted from the base station apparatus 2-1 to the mobile station apparatus 4. Suppose that the mobile station apparatus 4 moves to point B within the communication area 2-2a of the base station apparatus 2-2 by passing through the communication area 12a of the base station apparatus 12, as indicated by arrow 101.

Figure 2:
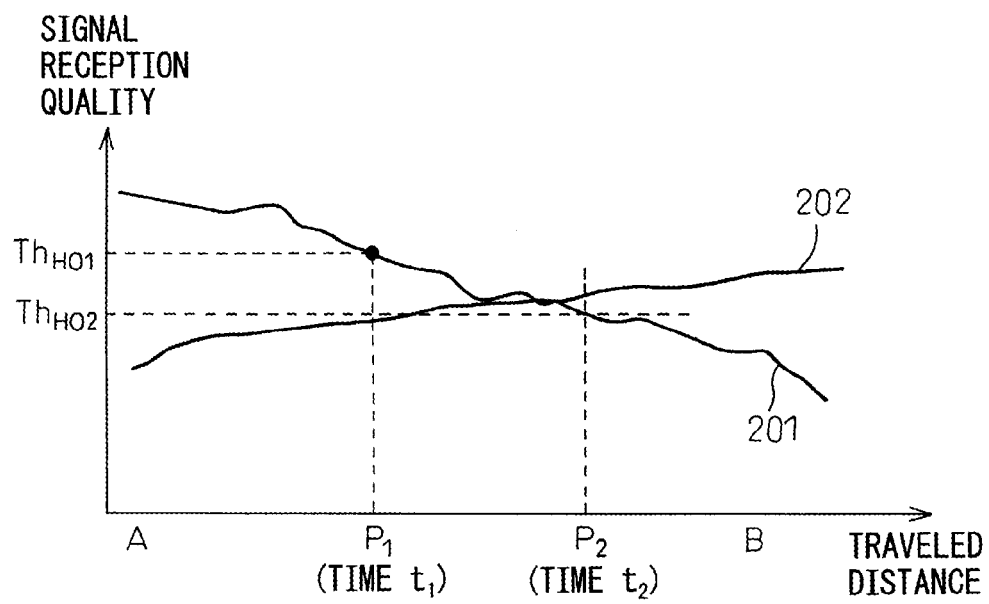
FIG. 2 is a conceptual diagram illustrating one example of how the quality of signals that a mobile station apparatus receives respectively from two base station apparatuses changes over time.

FIG. 2 is a conceptual diagram illustrating one example of how the quality of the signal being received by the mobile station apparatus 4 from the base station apparatus 2-1 and the quality of the signal being received from the base station apparatus 2-2 change over time when the mobile station apparatus 4 moves as described above. In FIG. 2, the abscissa represents the distance traveled from point A, and the ordinate the signal reception quality. Graph 201 depicts the quality of the signal being received from the base station apparatus 2-1, while graph 202 depicts the quality of the signal being received from the base station apparatus 2-2.

As illustrated in FIG. 2, the quality 201 of the signal being received from the base station apparatus 2-1 decreases as the mobile station apparatus 4 moves away from point A. Suppose that the quality of the signal being received by the mobile station apparatus 4 from the base station apparatus 2-1 drops to a first handover threshold $Th_{HO1}$ at time $t_1$ as the mobile station apparatus 4 moves to position $P_1$. The first handover threshold $Th_{HO1}$ here may be, for example, a normal handover threshold that is used when determining whether a handover is to be executed between base station apparatuses whose communication area overlap each other.

In the illustrated case, the base station apparatus 2-1 does not initiate a handover until after a predetermined period of time elapses from time $t_1$. Then, at time $t_2$ when the predetermined period of time has elapsed from time $t_1$, the base station apparatus 2-1 determines whether a handover is to be performed or not, based on the result of the comparison between each of the signal reception qualities 201 and 202 and a second handover threshold $Th_{HO2}$.

In the illustrated example, the quality 202 of the signal being received from the base station apparatus 2-2 improves as the mobile station apparatus 4 comes closer to point B within the communication area 2-2a. At time $t_2$ when the mobile station apparatus 4 is located at position $P_2$, the quality 202 of the signal being received from the base station apparatus 2-2 becomes higher than the second handover threshold $Th_{HO2}$. On the other hand, the quality 201 of the signal being received from the base station apparatus 2-1 becomes lower than the second handover threshold $Th_{HO2}$. Then, the base station apparatus 2-1 performs a handover within the mobile communication system 1 to switch the radio connection of the mobile station apparatus 4 to the base station apparatus 2-2.

Preferably, the second handover threshold $Th_{HO2}$ is set lower than the first handover threshold $Th_{HO1}$ in order to reduce the chance of a system handover. For example, the second handover threshold $Th_{HO2}$ may be set equal to a value corresponding to the minimum signal quality level that can maintain the minimum service (for example, voice communication) provided by the mobile communication system 1.

Alternatively, the second handover threshold $Th_{HO2}$ may be set equal to the first handover threshold $Th_{HO1}$. For example, the user carrying the mobile station apparatus 4 may move outside the communication area of the currently serving base station apparatus and thereafter enter the communication area of another base station apparatus in the mobile communication system 1 within the predetermined period of time. In this case, it is expected that the quality of the signal that the mobile station apparatus 4 receives from that other base station apparatus will exceed the first handover threshold $Th_{HO1}$ by the time the predetermined period of time elapses. In view of this, the predetermined period of time is set equal to or longer than the time expected to be taken to travel the distance from the boundary of the communication area of one base station apparatus to the boundary of the communication area of the other base station apparatus. In this way, even when the second handover threshold $Th_{HO2}$ is set equal to the first handover threshold $Th_{HO1}$, the mobile communication system 1 can reduce the chance of a system handover.

On the other hand, suppose that the mobile station apparatus 4 moves from point A within the communication area 2-1a of the base station apparatus 2-1 to point C located outside any of the communication areas of the base station apparatuses 2-1 to 2-3, as indicated by arrow 102.

Figure 3:
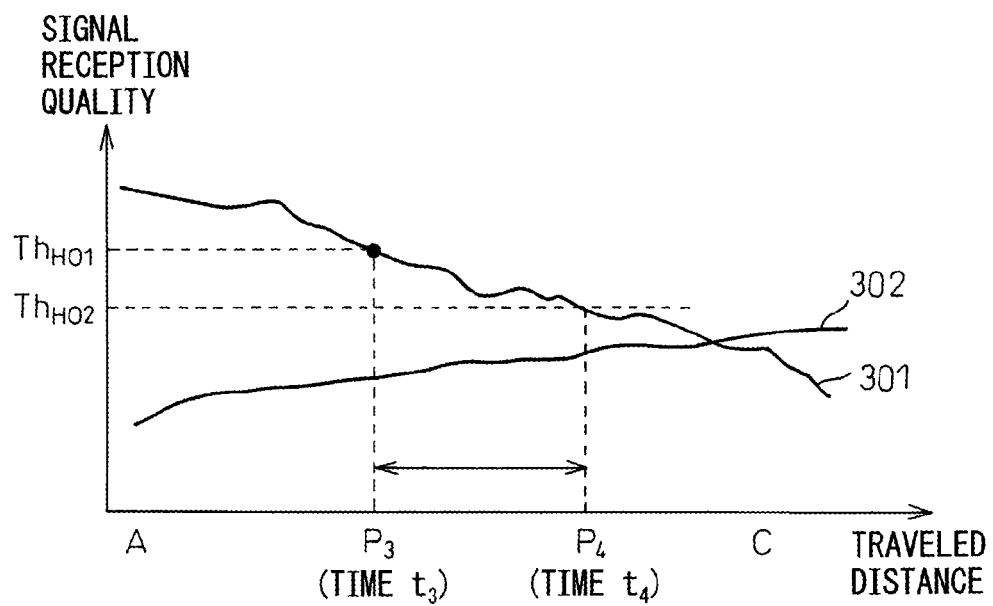
FIG. 3 is a conceptual diagram illustrating another example of how the quality of signals that the mobile station apparatus receives respectively from the two base station apparatuses changes over time.

FIG. 3 is a conceptual diagram illustrating another example of how the quality of the signal being received by the mobile station apparatus 4 from the base station apparatus 2-1 and the quality of the signal being received from the base station apparatus 2-2 change over time when the mobile station apparatus 4 moves as described above. In FIG. 3, the abscissa represents the distance traveled from point A, and the ordinate the signal reception quality. Graph 301 depicts the quality of the signal being received from the base station apparatus 2-1, while graph 302 depicts the quality of the signal being received from the base station apparatus 2-2.

As illustrated in FIG. 3, the quality 301 of the signal being received from the base station apparatus 2-1 decreases as the mobile station apparatus 4 moves away from the communication area 2-1a. Suppose that the quality of the signal being received by the mobile station apparatus 4 from the base station apparatus 2-1 drops to the first handover threshold $Th_{HO1}$ at time $t_3$ as the mobile station apparatus 4 moves to position $P_3$. Then, at time $t_4$ when the predetermined period of time has elapsed from time $t_3$, the base station apparatus 2-1 determines whether a handover is to be executed or not, based on the signal reception qualities 301 and 302.

In the illustrated example, since the mobile station apparatus 4 is not moving toward the communication area of the base station apparatus 2-2, the quality 302 of the signal being received from the base station apparatus 2-2 does not improve. As a result, at time $t_4$ when the mobile station apparatus 4 is located at position $P_4$, the quality 302 of the signal received from the base station apparatus 2-2 is lower than the second handover threshold $Th_{HO2}$. In this case, even if the mobile station apparatus 4 is linked via radio to the base station apparatus 2-2, the speed of communication between the mobile station apparatus 4 and the base station apparatus 2-2 does not improve. Therefore, the base station apparatus 2-1 chooses to perform a system handover.

FIGS. 4 and 5 are operation sequence diagrams illustrating a handover process performed in the mobile communication systems 1 and 11. The operation of each apparatus will be described by taking as an example the case in which the mobile station apparatus 4 initially located within the communication area 12a of the base station apparatus 12 moves into the communication area 2-2a of the base station apparatus 2-2 by passing through the communication area 2-1a of the base station apparatus 2-1. For convenience, in FIGS. 4 and 5, the base station apparatuses 2-1 to 2-3 are each designated as eNB, the radio network controller 13 as RNC, the base station apparatus 12 as BTS, and the mobile station apparatus 4 as UE.

The base station apparatus 12 transmits a common pilot channel (CPICH) signal to each mobile station apparatus located within its communication area 12a (step S101). When the CPICH signal is received, the mobile station apparatus 4 measures, based on the CPICH signal, the quality of the signal received from the base station apparatus 12 (step S102). For example, based on the pilot symbol contained in the CPICH, the mobile station apparatus 4 measures the signal to interference plus noise ratio (SIR) or the received signal strength indicator (RSSI) or the like, and takes the measured value to represent the signal reception quality. Then, the mobile station apparatus 4 transmits the result of the measurement to the radio network controller 13 via the base station apparatus 12 (step S103). For example, the mobile station apparatus 4 transmits a message containing the measured value of the signal reception quality to the radio network controller 13. If the quality of the received signal at the mobile station apparatus 4 is satisfactory, the radio connection between the mobile station apparatus 4 and the base station apparatus 12 is maintained, and the mobile station apparatus 4 continues to perform communication via the mobile communication system 11.

After that, the radio network controller 13 transmits to the mobile station apparatus 4, via the base station apparatus 12, base station installation information that carries a list of base station apparatuses each belonging to the mobile communication system 1 and having a communication area at least a portion of which overlaps the communication area 12a of the base station apparatus 12 (step S104). For example, the radio network controller 13 transmits the base station installation information to the mobile station apparatus 4 over a dedicated control channel (DCCH). The mobile station apparatus 4 stores the received base station installation information in its storage unit.

FIG. 6 is a diagram illustrating one example of the base station installation information. The base station installation information 600 stores information for one base station apparatus in each row. For each base station apparatus, the base station installation information 600 includes such fields as base station identification information 601, cell identification information 602 identifying the cell served by the base station apparatus, and carrier frequency identification information 603 identifying the carrier frequency used in that cell. For each base station apparatus, the base station installation information 600 further includes the field of nearest neighbor base station identification information 604 identifying the base station apparatus that is included in the mobile communication system 1 and that is located nearest to the base station apparatus concerned.

Referring back to FIG. 4, when the mobile station apparatus 4 enters the communication area 2-1a of the base station apparatus 2-1 in the mobile communication system 1, a system handover occurs. As a result, a radio connection is established between the mobile station apparatus 4 and the base station apparatus 2-1 (step S105). After the radio connection between the mobile station apparatus 4 and the base station apparatus 2-1 is established, a command that provides a trigger to measure the quality of the signal received from each base station apparatus is transmitted from the base station apparatus 2-1 to the mobile station apparatus 4 (step S106).

On the other hand, the mobile station apparatus 4 identifies the base station apparatus located nearest to the currently serving base station apparatus 2-1 by referring to the base station installation information. Then, the mobile station apparatus 4 transmits the identification information of the nearest neighbor base station apparatus to the base station apparatus 2-1, for example, over an uplink DCH (step S107). For example, when the base station apparatus 2-2 is the apparatus located nearest to the base station apparatus 2-1, the mobile station apparatus 4 transmits the identification information of the base station apparatus 2-2 to the base station apparatus 2-1. The base station apparatus 2-1 stores the identification information of the nearest neighbor base station apparatus in its storage unit.

The mobile station apparatus 4 measures the quality of the signal received from the currently serving base station apparatus 2-1 (step S108). For example, based on the pilot symbol contained in the CPICH received from the base station apparatus 2-1, the mobile station apparatus 4 measures SIR or RSSI or the like, and takes the measured value to represent the signal reception quality.

Further, the mobile station apparatus 4 receives a synchronization channel (SCH) signal from each base station apparatus located in the neighborhood thereof in the mobile communication system 1 (step S109). Then, the mobile station apparatus 4 measures the quality of the signal received from each base station apparatus (step S110). The mobile station apparatus 4 measures the signal reception quality by measuring the SIR or RSSI or the like of the SCH signal received from each base station apparatus.

The mobile station apparatus 4 transmits, to the base station apparatus 2-1, signal reception quality information that indicates the quality of the signal received from the currently serving base station apparatus 2-1 and the quality of the signal received from each of the other base station apparatuses in the mobile communication system 1 that are located in the neighborhood of the mobile station apparatus 4 (step S111). The mobile station apparatus 4 transmits the signal reception quality information to the base station apparatus 2-1, for example, over a DCCH. The base station apparatus 2-1 that received the signal reception quality information from the mobile station apparatus 4 stores the signal reception quality information for each base station apparatus in its storage unit by associating the signal reception quality information with the identification information of the corresponding base station apparatus and the date and time of reception of the signal reception quality information (step S112). Thereafter, the process from step S108 to step S112 is repeated at predetermined intervals of time.

As illustrated in FIG. 5, each time the signal reception quality information is received from the mobile station apparatus 4, the base station apparatus 2-1 checks to see whether or not the quality of the signal received by the mobile station apparatus 4 from the base station apparatus 2-1 has dropped to or below the first handover threshold $Th_{HO1}$ (step S113). If the received signal quality is higher than the first handover threshold $Th_{HO1}$ (No in step S113), the base station apparatus 2-1 repeats the process from step S108 to step S113.

On the other hand, if the received signal quality is equal to or lower than the first handover threshold $Th_{HO1}$ (Yes in step S113), the base station apparatus 2-1 starts its internal timer (step S114). Further, the base station apparatus 2-1 sets up a connection with the nearest neighbor base station apparatus. For example, when the nearest neighbor base station apparatus is the base station apparatus 2-2 as earlier described, the base station apparatus 2-1 sends a connection request signal to the base station apparatus 2-2 in accordance with the X2 interface that defines the communication interface between base station apparatuses (step S115). Then, when the base station apparatus 2-2 becomes ready to establish a connection, the base station apparatus 2-2 returns a connection setup response signal to the base station apparatus 2-1 (step S116). Then, a connection is established between the base station apparatus 2-1 and the base station apparatus 2-2.

When a predetermined period of time has elapsed after starting the timer, the base station apparatus 2-1 sends a measurement control message to request the mobile station apparatus 4 to send a measurement report (step S117). The mobile station apparatus 4 responds by returning a measurement report message (step S118). The base station apparatus 2-1 then makes a decision as to whether to execute a handover or a system handover, by referring to the measurement report message that indicates the quality of the signal received from the base station apparatus 2-1 and the quality of the signal received from the nearest neighbor base station apparatus (step S119). The details of how a selection is made between the handover and the system handover will be described later.

When the handover is selected, the base station apparatus 2-1 executes the handover within the mobile communication system 1, for example, in accordance with the handover procedure defined in LTE. For example, the base station apparatus 2-1 sends a handover command for commanding the mobile station apparatus 4 to switch its connection to a handover target base station apparatus. Further, the base station apparatus 2-1 forwards the downlink signal buffered therein to the handover target base station apparatus. Then, the mobile station apparatus 4 performs processing for synchronization with the target base station apparatus. The target base station apparatus requests the upper node apparatus 3 to change the path for the mobile station apparatus 4. After that, the base station apparatus 2-1 releases the resources secured for the communication with the mobile station apparatus 4. Then, the connection between the base station apparatus 2-1 and the target base station apparatus is severed.

Figure 7A:
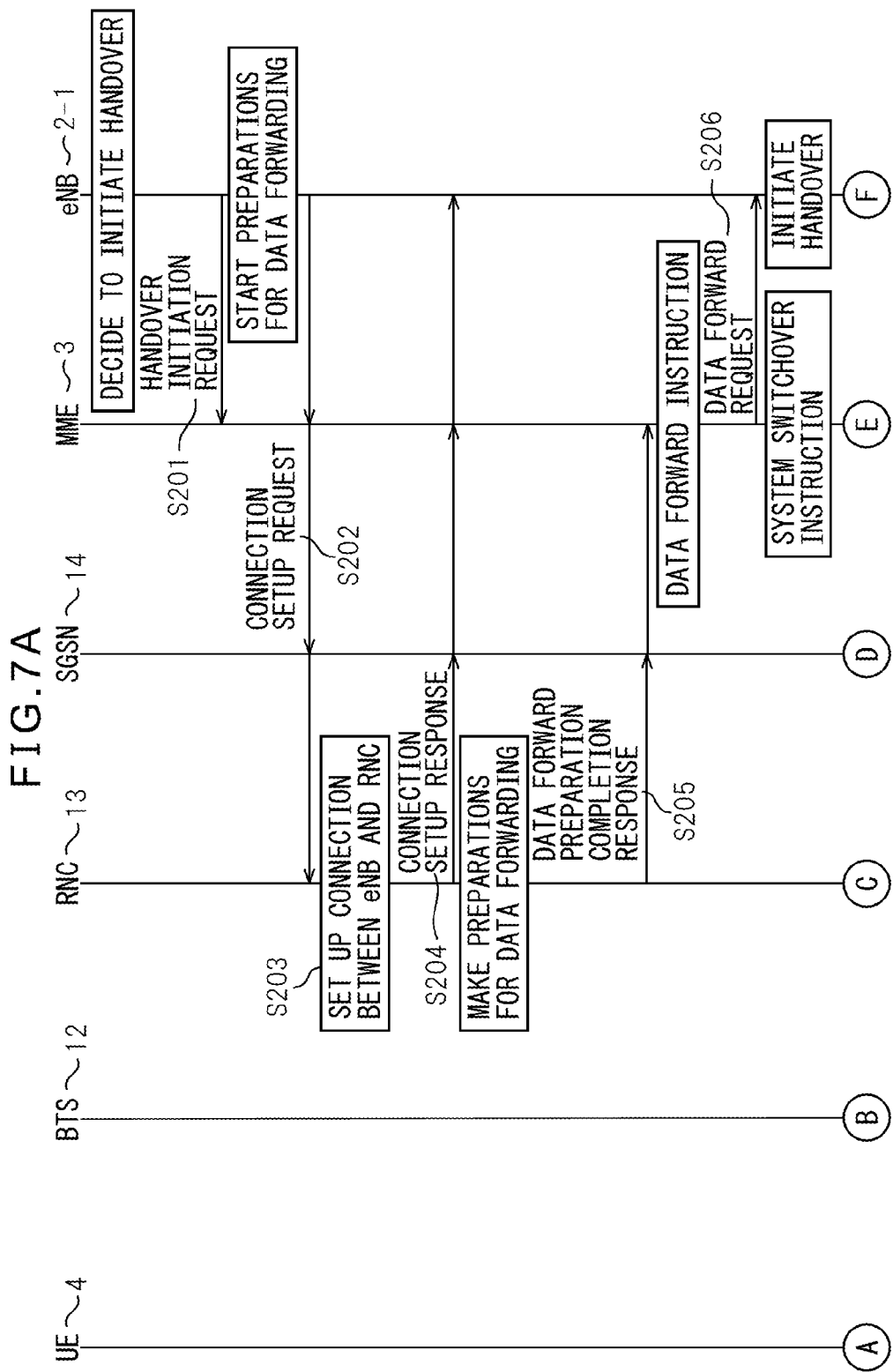

FIG. 7 is an operation sequence diagram illustrating a procedure for a system handover from the mobile communication system 1 to the mobile communication system 11. The illustrated procedure is carried out when the base station apparatus 2-1 has decided to execute the system handover in step S119 in the operation sequence of FIG. 5. The following description is given by assuming that the mobile station apparatus 4 is linked via radio to the base station apparatus 2-1 before the system handover is executed.

Further, for convenience, in FIG. 7, the base station apparatus 2-1 is designated as eNB, the upper node apparatus 3 as MME, the serving GPRS support node 14 as SGSN, the radio network controller 13 as RNC, the base station apparatus 12 as BTS, and the mobile station apparatus 4 as UE.

The base station apparatus 2-1 sends a handover initiation request command to the upper node apparatus 3 (step S201). Further, the base station apparatus 2-1 makes preparations for data forwarding. Then, the base station apparatus 2-1 sends a connection setup request command to the radio network controller 13 via the upper node apparatus 3 and via the serving GPRS support node 14 in the mobile communication system 11 (step S202). The radio network controller 13 that received the connection setup request command sets up a connection to the base station apparatus 2-1 via the serving GPRS support node 14 and the upper node apparatus 3 (step S203). Then, the radio network controller 13 returns a connection setup response message to the base station apparatus 2-1 via the serving GPRS support node 14 and the upper node apparatus 3 (step S204).

Further, after receiving the connection setup request command, the radio network controller 13 makes preparations for data forwarding, for example, by securing resources for data forwarding. Then, after completing the preparations for data forwarding, the radio network controller 13 sends a data forward preparation completion response message to the upper node apparatus 3 via the serving GPRS support node 14 (step S205).

The upper node apparatus 3 that received the data forward preparation completion response message sends a data forward request command to the base station apparatus 2-1 (step S206). Further, the upper node apparatus 3 sends a system switchover control command to the base station apparatus 12 via the serving GPRS support node 14 and the radio network controller 13. The upper node apparatus 3 also sends a system switchover control command to the mobile station apparatus 4 via the base station apparatus 2-1 (step S207). The mobile station apparatus 4 that received the system switchover control command activates its communication function designed to communicate with the mobile communication system 11.

The base station apparatus 2-1 that received the data forward request command sends a handover request command to the mobile station apparatus 4 (step S208). The mobile station apparatus 4 refers to the handover request command and identifies the target base station apparatus for handover. Then, the mobile station apparatus 4 performs processing for synchronization with the target base station apparatus (step S209). In this way, a radio connection is established between the mobile station apparatus 4 and the base station apparatus 12.

When the radio connection between the mobile station apparatus 4 and the base station apparatus 12 is thus established, the base station apparatus 12 sends a message to the upper node apparatus 3 via the radio network controller 13 and the serving GPRS support node 14 to notify that the radio connection has been established (step S210). Further, the base station apparatus 12 sends a handover completion notification message to the radio network controller 13 (step S211).

After receiving the message reporting the establishment of the radio connection, the upper node apparatus 3 sends a data forward request command to the base station apparatus 2-1 (step S212). The base station apparatus 2-1 that received the data forward request command forwards the downlink data buffered in its storage unit to the radio network controller 13 via the upper node apparatus 3 and the serving GPRS support node 14 (step S213). After all the downlink data buffered in the base station apparatus 2-1 has been forwarded, the radio network controller 13 sends a system switchover completion notification message to the upper node apparatus 3 via the serving GPRS support node 14 (step S214). After that, the radio network controller 13 and the base station apparatus 2-1 release the connection between the radio network controller 13 and the base station apparatus 2-1 (step S215). Further, the upper node apparatus 3 removes the mobile station apparatus 4 from its management list, and completes the system switchover (sep S216). The system handover is thus completed.

Thereafter, the mobile station apparatus 4 receives the downlink data forwarded via the radio network controller 13. Then, the mobile station apparatus 4 performs communication via the base station apparatus 12 in the mobile communication system 11.

FIG. 8 is an operation sequence diagram illustrating a procedure for a system handover from the mobile communication system 11 to the mobile communication system 1. The illustrated procedure is carried out, for example, in step S105 in the operation sequence of FIG. 4. The following description is given by assuming that the mobile station apparatus 4 is linked via radio to the base station apparatus 2-1 after the system handover is executed. Further, for convenience, in FIG. 8, the base station apparatus 2-1 is designated as eNB, the upper node apparatus 3 as MME, the serving GPRS support node 14 as SGSN, the radio network controller 13 as RNC, the base station apparatus 12 as BTS, and the mobile station apparatus 4 as UE.

When it is decided to initiate the handover, the radio network controller 13 sends a connection setup request command to the base station apparatus 2-1 via the serving GPRS support node 14 and the upper node apparatus 3 (step S301). The base station apparatus 2-1 that received the connection setup request command sets up a connection to the radio network controller 13 via the upper node apparatus 3 and the serving GPRS support node 14 (step S302). After the connection setup is completed, the base station apparatus 2-1 returns a connection setup response message to the radio network controller 13 via the upper node apparatus 3 and the serving GPRS support node 14 (step S303).

After receiving the connection setup response message, the radio network controller 13 sends a data forward preparation request command to the base station apparatus 2-1 via the serving GPRS support node 14 and the upper node apparatus 3 (step S304).

The base station apparatus 2-1 that received the data forward preparation request command makes preparations for data forwarding, for example, by securing resources for data forwarding. Then, after completing the preparations for data forwarding, the base station apparatus 2-1 sends a data forward preparation completion response message to the radio network controller 13 via the upper node apparatus 3 and the serving GPRS support node 14 (step S305).

The radio network controller 13 that received the data forward preparation completion response message initiates the handover process. The radio network controller 13 first sends a handover request command to the base station apparatus 2-1 via the serving GPRS support node 14 and the upper node apparatus 3 (step S306).

Further, the radio network controller 13 sends a system switchover control command to the mobile station apparatus 4 via the base station apparatus 12 (step S307). The mobile station apparatus 4 that received the system switchover control command activates its communication function designed to communicate with the mobile communication system 1.

The base station apparatus 2-1 that received the handover request command returns a handover request response message to the upper node apparatus 3 (step S308). Then, the base station apparatus 2-1 performs processing for synchronization with the mobile station apparatus 4 (step S309). In this way, a radio connection is established between the base station apparatus 2-1 and the mobile station apparatus 4.

On the other hand, the upper node apparatus 3 that received the handover request response message waits until the radio connection between the base station apparatus 2-1 and the mobile station apparatus 4 is established.

When the radio connection between the base station apparatus 2-1 and the mobile station apparatus 4 is established, the base station apparatus 2-1 sends a message to the upper node apparatus 3 to notify that the radio connection has been established (step S310). After that, the upper node apparatus 3 sends a data forward request command to the radio network controller 13 (step S311). The radio network controller 13 that received the data forward request command forwards the downlink data buffered in its storage unit to the base station apparatus 2-1 via the serving GPRS support node 14 and the upper node apparatus 3 (step S312).

After all the downlink data buffered in the radio network controller 13 has been forwarded, the base station apparatus 2-1 sends a handover completion notification message to the upper node apparatus 3 (step S313). The upper node apparatus 3 that received the handover completion notification message sends a system switchover completion notification message to the radio network controller 13 via the serving GPRS support node 14 (step S314).

After that, the radio network controller 13 and the base station apparatus 2-1 release the connection between the radio network controller 13 and the base station apparatus 2-1 (step S315). Further, the upper node apparatus 3 registers the mobile station apparatus 4 in its management list, and completes the system switchover (sep S316). The system handover is thus completed.

Thereafter, the mobile station apparatus 4 receives the downlink data forwarded via the base station apparatus 2-1. Then, the mobile station apparatus 4 performs communication via the base station apparatus 2-1 in the mobile communication system 1.

FIG. 9 is an operation flowchart illustrating a handover execution decision procedure which is performed at each of the base station apparatuses 2-1 to 2-3 in the mobile communication system 1. The following description is given by assuming that the base station apparatus 2-1 performs this handover process.

The base station apparatus 2-1 receives signal reception quality information from the mobile station apparatus 4 (step S401). By referring to the signal reception quality information, the base station apparatus 2-1 determines whether or not the signal reception quality $Q_1$ for the base station apparatus 2-1 has dropped to or below the first handover threshold $Th_{HO1}$ (step S402).

If the signal reception quality $Q_1$ is higher than the first handover threshold $Th_{HO1}$ (No in step S402), there is no need to execute handover. Therefore, the base station apparatus 2-1 returns to step S401 to repeat the above process.

On the other hand, if the signal reception quality $Q_1$ is equal to or lower than the first handover threshold $Th_{HO1}$ (Yes in step S402), the base station apparatus 2-1 determines whether or not there is any neighbor base station apparatus in the same mobile communication system 1 as the base station apparatus 2-1 by checking whether or not the nearest neighbor base station identification information transmitted from the mobile station apparatus 4 is stored in the storage unit (step S403).

If the nearest neighbor base station identification information is not stored in the storage unit of the base station apparatus 2-1 (No in step S403), it is determined that there is no neighbor base station apparatus. Then, the base station apparatus 2-1 determines whether the mobile station apparatus 4 is located within the communication area of the base station apparatus 12 which belongs to the other mobile communication system 11 (step S404). To make this determination, the mobile station apparatus 4, for example, measures the quality of the signal received from the base station apparatus 12 belonging to the mobile communication system 11 and transmits the result of the measurement to the base station apparatus 2-1. Then, if the quality of the signal received from the base station apparatus 12 is higher than the first handover threshold $Th_{HO1}$, the base station apparatus 2-1 can determine that the mobile station apparatus 4 is located within the communication area of the base station apparatus 12.

If the mobile station apparatus 4 is not located within the communication area of the base station apparatus 12 (No in step S404), there is no handover candidate base station apparatus in the neighborhood of the mobile station apparatus 4. Therefore, the base station apparatus 2-1 returns to step S401 to repeat the above process. In this process, if the quality of the signal being received by the mobile station apparatus 4 from the base station apparatus 2-1 drops to a level at which the radio connection can no longer be maintained, the mobile station apparatus 4 is disconnected from any landline apparatus in the mobile communication system 1.

On the other hand, if the mobile station apparatus 4 is located within the communication area of the base station apparatus 12 (Yes in step S404), the base station apparatus 2-1 decides to perform a system handover (step S405).

If the nearest neighbor base station identification information is stored in the storage unit of the base station apparatus 2-1 (Yes in step S403), it is determined that there is a base station apparatus in the neighborhood. Then, the base station apparatus 2-1 changes the handover threshold to the second handover threshold $Th_{HO2}$ (step S406). The base station apparatus 2-1 starts its internal timer (step S407). Further, the base station apparatus 2-1 sets up a connection with the nearest neighbor base station apparatus (step S408). Then, the base station apparatus 2-1 determines whether a predetermined period of time has elapsed after starting the timer (step S409).

If the predetermined period of time has not yet elapsed after starting the timer (No in step S409), the base station apparatus 2-1 repeats the process of step S409. When the predetermined period of time has elapsed after starting the timer (Yes in step S409), the base station apparatus 2-1 once again receives the signal reception quality information from the mobile station apparatus 4 (step S410). The predetermine period of time is, for example, an estimated value of the time that elapses from the moment the user carrying the mobile station apparatus 4 moves outside the communication area of the base station apparatus 2-1 until the user reaches the communication area of the nearest neighbor base station apparatus.

The base station apparatus 2-1 determines whether or not the quality $Q_1$ of the signal received by the mobile station apparatus 4 from the base station apparatus 2-1 has dropped to or below the second handover threshold $Th_{HO2}$ (step S411). If the signal reception quality $Q_1$ is higher than the second handover threshold $Th_{HO2}$ (No in step S411), the base station apparatus 2-1 does not perform handover, but repeats the process starting from step S401.

On the other hand, if the signal reception quality $Q_1$ is equal to or lower than the second handover threshold $Th_{HO2}$ (Yes in step S411), the base station apparatus 2-1 proceeds to determine whether or not the quality $Q_2$ of the signal received by the mobile station apparatus 4 from the nearest neighbor base station apparatus is equal to or higher than the second handover threshold $Th_{HO2}$ (step S412).

If the signal reception quality $Q_2$ is lower than the second handover threshold $Th_{HO2}$ (No in step S412), then even if the mobile station apparatus 4 is connected via radio to the nearest neighbor base station apparatus, the communication speed will not improve because the signal reception quality $Q_2$ is low. Accordingly, the base station apparatus 2-1 decides to perform a system handover (step S405). On the other hand, if the signal reception quality $Q_2$ is equal to or higher than the second handover threshold $Th_{HO2}$ (Yes in step S412), the base station apparatus 2-1 decides to perform a handover to the nearest neighbor base station apparatus (step S413).

After step S405 or step S413, the mobile communication system 1 proceeds to carry out a handover or a system handover, whichever is selected.

The process of step S408 may be carried out after step S413. This serves to prevent an unnecessary connection from being set up between the base station apparatuses in the mobile communication system 1 in a system handover situation.

Further, the base station apparatus 2-1 may decide to perform an intra-system handover if it is determined in step S411 that the signal reception quality $Q_2$ is equal to or higher than the second handover threshold $Th_{HO2}$ and if it is determined before and after step S411 that the signal reception quality $Q_2$ has improved. For example, the condition that the signal reception quality $Q_2$ at the time of the execution of step S411 is higher than the signal reception quality $Q_2$ before and after the execution of step S402 may be added to the condition for the base station apparatus 2-1 to decide to perform an intra-system handover. By thus checking that the signal reception quality $Q_2$ improves, the base station apparatus 2-1 can deduce that the mobile station apparatus 4 is moving toward the communication area of the nearest neighbor base station apparatus. As a result, by adding the improvement of the signal reception quality $Q_2$ to the condition for deciding to perform an intra-system handover, the mobile communication system 1 can reduce the chance of an intra-system handover failure.

The configuration of each apparatus in the mobile communication system 1 for implementing the above process will be described in detail below.

FIG. 10 is a diagram schematically illustrating the configuration of the base station apparatus 2-1. Since the base station apparatuses 2-1 to 2-3 are identical in function and configuration, the following description deals only with the base station apparatus 2-1.

The base station apparatus 2-1 includes a radio processing unit 21, an antenna 22, a wired interface unit 23, a storage unit 24, a reception processing unit 25, a link control unit 26, a control channel signal generating unit 27, and a transmission processing unit 28. The radio processing unit 21, the storage unit 24, the link control unit 26, the control channel signal generating unit 27, and the transmission processing unit 28 are implemented as separate circuits. Alternatively, these units may be mounted on the base station apparatus 2-1 by implementing them in the form of a single integrated circuit on which the circuits corresponding to the respective units are integrated.

The radio processing unit 21 receives from the transmission processing unit 28 a downlink signal generated by modulating and multiplexing various kinds of control signals and downlink data, and superimposes it onto a carrier having a radio frequency. Then, the radio processing unit 21 amplifies the downlink signal superimposed on the carrier to a desired level by a high-power amplifier (not depicted), and passes it to the antenna 22 for transmission to the mobile station apparatus 4. On the other hand, an uplink signal received by the antenna 22 is passed to the radio processing unit 21 where it is amplified by a low-noise amplifier (not depicted). The radio processing unit 21 multiplies the thus amplified uplink signal by a periodic signal having an intermediate frequency and thereby converts the frequency of the uplink signal from the radio frequency to the baseband frequency. Then, the radio processing unit 21 passes the uplink signal to the reception processing unit 25.

The downlink signal passed from the radio processing unit 21 is radiated from the antenna 22. On the other hand, the uplink signal transmitted from the mobile station apparatus 4 is received by the antenna 22 and passed to the radio processing unit 21.

The wired interface unit 23 includes a communication interface circuit for connecting with the upper node apparatus 3 or other base station apparatus. The wired interface unit 23 receives downlink data from the upper node apparatus 3 and passes the downlink data to the transmission processing unit 26. Further, the wired interface unit 23 receives uplink data from the reception processing unit 25 and transmits the uplink data to the upper node apparatus 3. When a handover occurs, the wired interface unit 23 receives downlink data from the other base station apparatus or transmits the downlink data to that other base station apparatus.

The storage unit 24 includes, for example, an alterable nonvolatile semiconductor memory. The storage unit 24 stores various kinds of information, such as the identification information of the base station apparatus 2-1 and the frequencies used, that are used for controlling the radio connection with the mobile station apparatus 4. The storage unit 24 is also used to temporarily store uplink data or downlink data. The storage unit 24 further stores the identification information of the nearest neighbor base station apparatus.

The reception processing unit 25 includes a demodulating unit 251, an uplink data processing unit 252, an uplink control channel processing unit 253, a nearest neighbor base station identifying unit 254, a signal quality information detecting unit 255, and a handover decision unit 256.

The demodulating unit 251 demultiplexes and demodulates the uplink signal in accordance with a prescribed multiplexing scheme. The demodulating unit 251 passes the demultiplexed uplink data to the uplink data processing unit 252. Further, the demodulating unit 251 passes the uplink control signal to the uplink control channel processing unit 253. A single carrier frequency division multiplexing (SC-FDMA) scheme, for example, may be employed as the multiplexing scheme for the uplink signal.

The uplink data processing unit 252 applies reception processing such as error-correction decoding to the uplink data. The uplink data processing unit 252 passes the thus processed uplink data to the wired interface unit 23.

The uplink control channel processing unit 253 performs processing such as transmit power control in accordance with the control signal received via a control channel such as an unlink DCH. Further, the uplink control channel processing unit 253 transfers the base station installation information, received from the mobile station apparatus 4, to the storage unit 24 for storage. The uplink control channel processing unit 253 passes the signal reception quality information received from the mobile station apparatus 4 to the signal quality information detecting unit 255.

When an inquiry as to the presence or absence of a nearest neighbor base station apparatus is received from the handover decision unit 256, the nearest neighbor base station identifying unit 254 checks to see if the identification information of the nearest neighbor base station apparatus is stored in the storage unit 24. If the identification information of the nearest neighbor base station apparatus is stored in the storage unit 24, the nearest neighbor base station identifying unit 254 passes the identification information to the signal quality information detecting unit 255 as well as to the handover decision unit 256. On the other hand, if the identification information of the nearest neighbor base station apparatus is not stored in the storage unit 24, the nearest neighbor base station identifying unit 254 notifies the handover decision unit 256 accordingly.

The signal quality information detecting unit 255 detects from the signal reception quality information the measured value of the signal reception quality associated with the identification information of the nearest neighbor base station apparatus passed from the nearest neighbor base station identifying unit 254. The signal quality information detecting unit 255 also detects from the signal reception quality information the measured value of the signal reception quality for the base station apparatus 2-1. Then, the signal quality information detecting unit 255 passes the measured value of the signal reception quality for the base station apparatus 2-1 and the measured value of the signal reception quality for the nearest neighbor base station apparatus to the handover decision unit 256.

The handover decision unit 256 makes a decision as to whether to execute a handover or a system handover, based on the measured value of the signal reception quality for the base station apparatus 2-1 and the measured value of the signal reception quality for the nearest neighbor base station apparatus. More specifically, in accordance with the operation flowchart illustrated in FIG. 9, the handover decision unit 256 makes a decision as to whether to execute a handover or a system handover. When it is decided to execute a handover or a system handover, the handover decision unit 256 notifies the link control unit 26 of the type of handover to be executed. Further, when the signal reception quality for the base station apparatus 2-1 has dropped to or below the first handover threshold $Th_{HO1}$, the handover decision unit 256 passes the identification information of the nearest neighbor base station apparatus to the link control unit 26 and requests to set up a connection to the nearest neighbor base station apparatus.

When the signal reception quality for the base station apparatus 2-1 has dropped to or below the first handover threshold $Th_{HO1}$, the handover decision unit 256 may compare the signal reception quality for some other base station apparatus in the mobile communication system 1 with the first handover threshold $Th_{HO1}$. Then, if the signal reception quality for some other base station apparatus in the mobile communication system 1 is higher than the first handover threshold $Th_{HO1}$, the handover decision unit 256 may decide to execute a handover within the mobile communication system 1. In this case, the handover decision unit 256 notifies the link control unit 26 of the occurrence of a handover and the identification information of the handover target base station.

The link control unit 26 performs processing to set up or release connections with the other base station apparatuses 2-2 and 2-3. Further, the link control unit 26 performs handover-related processing between the base station apparatuses involved or between the base station apparatus and the upper node apparatus. For example, when a request to set up a connection with the nearest neighbor base station apparatus is received from the handover decision unit 256, the link control unit 26 establishes the connection between the base station apparatus 2-1 and the nearest neighbor base station apparatus in accordance with the X2 interface that defines the communication interface between base station apparatuses. When a handover occurs, the link control unit 26 forwards the downlink data stored in the storage unit 24 to the handover destination base station apparatus. Further, when a system handover occurs, the link control unit 26 performs processing related to the system handover.

The control channel signal generating unit 27 generates control signals such as broadcast information to be transmitted to the mobile station apparatus 4 via a broadcast channel (BCH) or an SCH. The control channel signal generating unit 27 passes the generated control signals to the transmission processing unit 28.

The transmission processing unit 28 includes a downlink data processing unit 281 and a modulating unit 282.

The downlink data processing unit 281 applies transmission processing such as error-correction coding to the downlink data received from the wired interface unit 23. Further, the downlink data processing unit 281 performs processing, such as reordering and retransmission control, on the signal to be transmitted to the mobile station apparatus 4. The downlink data processing unit 281 passes the thus processed downlink data to the modulating unit 282.

The modulating unit 282 multiplexes and modulates the downlink data and control signals in accordance with a prescribed multiplexing scheme. The prescribed multiplexing scheme here is, for example, an orthogonal frequency-division multiplexing (OFDM) scheme. The modulating unit 282 passes the multiplexed downlink signal to the radio processing unit 21.

Figure 11:
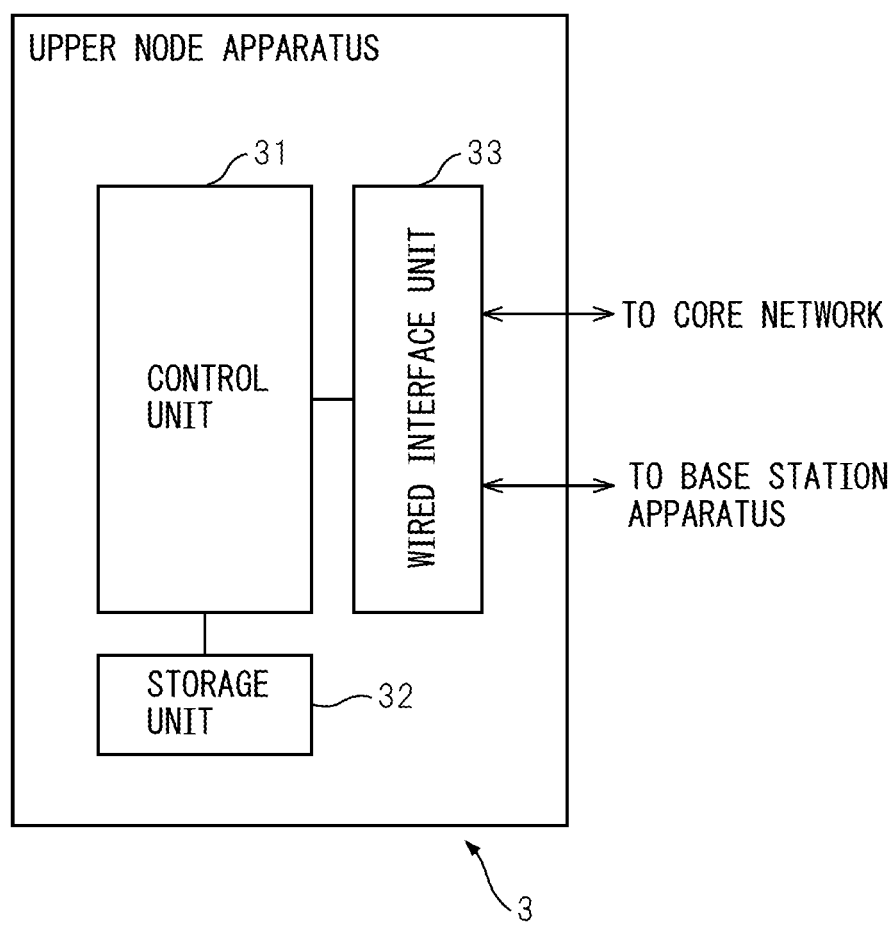
FIG. 11 is a diagram schematically illustrating the configuration of an upper node apparatus in the mobile communication system according to the one embodiment.

FIG. 11 is a diagram schematically illustrating the configuration of the upper node apparatus 3. The upper node apparatus 3 includes a control unit 31, a storage unit 32, and a wired interface unit 33.

The control unit 31 includes, for example, one or a plurality of processors and their peripheral circuitry. The control unit 31 has the function of supervising the location and condition of each mobile station apparatus located within the communication area served by any one of the base station apparatuses connected to the upper node apparatus 3.

Further, the control unit 31 performs routing for the signal received from the communicating mobile station apparatus 4. For example, the control unit 31 passes the uplink data, received from the communicating mobile station apparatus 4, to the wired interface unit 33 which then transmits out the signal on the core network. On the other hand, when downlink data addressed to the communicating mobile station apparatus 4 is received from the core network via the wired interface unit 33, the control unit 31 transmits the downlink data via the wired interface unit 33 to the base station apparatus to which the mobile station apparatus is linked via radio. Further, of the various kinds of processing related to a handover and a system handover, the control unit 31 performs processing for which the upper node apparatus 3 is responsible.

The storage unit 32 includes, for example, an alterable nonvolatile semiconductor memory. The storage unit 32 stores various kinds of information used to perform control to communicate with the mobile station apparatus radio-linked to any one of the base station apparatuses connected to the upper node apparatus 3.

The wired interface unit 33 includes a communication interface for connecting the upper node apparatus 3 to the core network or to any one of the base station apparatuses. The wired interface unit 33 receives from the core network the downlink data addressed to the mobile station apparatus radio-linked to any one of the base station apparatuses connected to the upper node apparatus 3, and passes the downlink data to the control unit 31. Further, when the downlink data is received from the control unit 31, the wired interface unit 33 transmits the downlink data to the base station apparatus to which the destination mobile station apparatus of the downlink data is linked via radio.

On the other hand, when uplink data is received from any one of the base station apparatuses, the wired interface unit 33 passes the uplink data to the control unit 31. Further, when the uplink data is received from the control unit 31, the wired interface unit 33 transmits out the uplink data on the core network.

Figure 12:
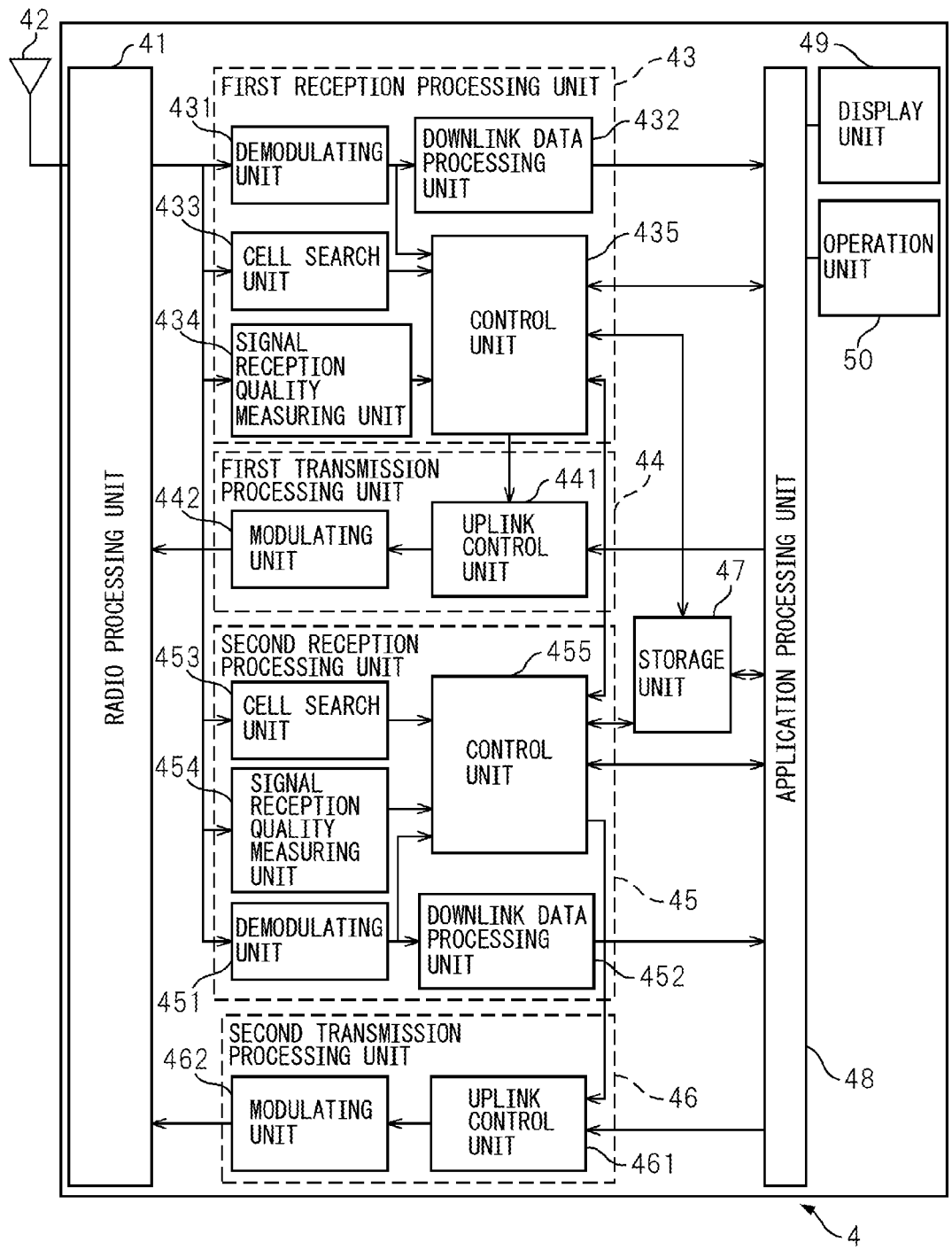
FIG. 12 is a diagram schematically illustrating the configuration of the mobile station apparatus in the mobile communication system according to the one embodiment.

FIG. 12 is a diagram schematically illustrating the configuration of the mobile station apparatus 4. The mobile station apparatus 4 includes a radio processing unit 41, an antenna 42, a first reception processing unit 43, a first transmission processing unit 44, a second reception processing unit 45, a second transmission processing unit 46, a storage unit 47, an application processing unit 48, a display unit 49, and an operation unit 50. The radio processing unit 41, the first reception processing unit 43, the first transmission processing unit 44, the second reception processing unit 45, the second transmission processing unit 46, the storage unit 47, and the application processing unit 48 are implemented as separate circuits. Alternatively, these units may be mounted on the mobile station apparatus 4 by implementing them in the form of a single integrated circuit on which the circuits corresponding to the respective units are integrated.

The radio processing unit 41 receives from the first transmission processing unit 44 or the second transmission processing unit 46 an uplink signal generated by modulating and multiplexing various kinds of control signals and uplink data, and superimposes it onto a carrier having a radio frequency. Then, the radio processing unit 41 amplifies the uplink signal superimposed on the carrier to a desired level by a high-power amplifier (not depicted), and passes it to the antenna 42 for transmission to the base station apparatus. On the other hand, a downlink signal received by the antenna 42 is passed to the radio processing unit 41 where it is amplified by a low-noise amplifier (not depicted). The radio processing unit 41 multiplies the thus amplified downlink signal by a periodic signal having an intermediate frequency and thereby converts the frequency of the downlink signal from the radio frequency to the baseband frequency. Then, the radio processing unit 41 passes the downlink signal to the first reception processing unit 43 or the second reception processing unit 45.

The uplink signal passed from the radio processing unit 41 is radiated from the antenna 42. On the other hand, the downlink signal transmitted from the base station apparatus is received by the antenna 42 and passed to the radio processing unit 41.

The first reception processing unit 43 performs processing for downlink signal reception in accordance with the protocol of the mobile communication system 11 during the period that the mobile station apparatus 4 is radio linked to the base station apparatus in the mobile communication system 11. For this purpose, the first reception processing unit 43 includes a demodulating unit 431, a downlink data processing unit 432, a cell search unit 433, a signal reception quality measuring unit 434, and a control unit 435.

The demodulating unit 431 demultiplexes and demodulates the downlink signal in accordance with a multiplexing scheme defined by the protocol of the mobile communication system 11. The demodulating unit 431 passes the demultiplexed downlink data to the downlink data processing unit 432. Further, the demodulating unit 431 passes the downlink control signals to the control unit 435. The multiplexing scheme defined by the protocol of the mobile communication system 11 is, for example, a code division multiple access (CDMA) scheme.

The downlink data processing unit 432 applies reception processing, such as error-correction decoding and despreading, to the downlink data. The downlink data processing unit 432 passes the thus processed downlink data to the application processing unit 48.

The cell search unit 433 performs synchronization based on the SCH signal received as one of the control signals from the base station apparatus, and thereby identifies the frame and slot timing used for communication with the serving base station apparatus. Further, based on the SCH signal, the cell search unit 433 identifies cell-specific information such as a scrambling code. Then, the cell search unit 433 passes the thus identified frame and slot timing and the cell-specific information to the control unit 435.

The signal reception quality measuring unit 434 measures the quality of the signal received from the base station apparatus serving the mobile station apparatus 4. To that end, the signal reception quality measuring unit 434 measures the value of a signal reception quality metric, such as SIR or RSSI, based, for example, on the CPICH signal received from the serving base station apparatus.

The signal reception quality measuring unit 434 also measures the quality of the signal received from other base station apparatus located in the neighborhood of the mobile station apparatus 4 but not currently serving the mobile station apparatus 4. To that end, the signal reception quality measuring unit 434 measures the value of a metric, such as SIR or RSSI, based, for example, on the SCH signal received from such base station apparatus.

The signal reception quality measuring unit 434 passes the measured value of the signal reception quality metric to the control unit 435.

In accordance with the control signals received through a control channel such as a downlink DCH and an instruction received from the application processing unit 48, the control unit 435 performs various control operations such as call control related to the communication between the mobile station apparatus 4 and the base station apparatus. Further, the control unit 435 transfers the base station installation information, received from the base station apparatus and processed by the radio processing unit 41, to the storage unit 47 for storage. The control unit 435 creates signal reception quality information based on the quality of the signal received from each base station apparatus, and passes the signal reception quality information to the uplink control unit 441 in the first transmission processing unit 44.

When a signal requesting a system switchover is received from the base station apparatus or the radio network controller, the control unit 435 notifies the control unit 455 in the second reception processing unit 45 of the initiation of a system switchover. Conversely, when the second reception processing unit 45 is currently used for downlink signal reception, if the control unit 435 receives a system switchover initiation notification from the control unit 455 in the second reception processing unit 45, the control unit 435 activates the first reception processing unit 43 and the first transmission processing unit 44.

Further, when the second reception processing unit 45 is currently used for downlink signal reception, if a system switchover operation is performed on the operation unit 50, its operation signal is transferred via the application processing unit 48 to the control unit 435. In this case also, the control unit 435 activates the first reception processing unit 43 and the first transmission processing unit 44.

The first transmission processing unit 44 performs processing for downlink signal transmission in accordance with the protocol of the mobile communication system 11 during the period that the mobile station apparatus 4 is radio linked to the base station apparatus in the mobile communication system 11. For this purpose, the first transmission processing unit 44 includes an uplink control unit 441 and a modulating unit 442.

The uplink control unit 441 applies transmission processing, such as error-correction coding and spreading, to the uplink data received from the application processing unit 48. Further, the uplink control unit 441 generates various kinds of uplink control signals including the signal reception quality information. The uplink control unit 441 passes the thus processed uplink data and the control signals to the modulating unit 442.

The modulating unit 442 generates the uplink signal by multiplexing and modulating the uplink data and the control signals in accordance with a multiplexing scheme defined by the protocol of the mobile communication system 11. The multiplexing scheme is, for example, a CDMA scheme. The modulating unit 442 supplies the uplink signal to the radio processing unit 41.

The second reception processing unit 45 performs processing for downlink signal reception in accordance with the protocol of the mobile communication system 1 during the period that the mobile station apparatus 4 is radio linked to any one of the base station apparatuses in the mobile communication system 1. For this purpose, the second reception processing unit 45 includes a demodulating unit 451, a downlink data processing unit 452, a cell search unit 453, a signal reception quality measuring unit 454, and a control unit 455. These units constituting the second reception processing unit 45 are identical in function to the corresponding units in the first reception processing unit 43, except for differences that arise due to the difference in the protocol used. Therefore, the various units constituting the second reception processing unit 45 will be described below by dealing only with the differences from the corresponding units in the first reception processing unit 43.

The demodulating unit 451 demultiplexes and demodulates the downlink signal in accordance with a multiplexing scheme defined by the protocol of the mobile communication system 1. The demodulating unit 451 passes the demultiplexed downlink data to the downlink data processing unit 452. Further, the demodulating unit 451 passes the downlink control signals to the control unit 455. The multiplexing scheme defined by the protocol of the mobile communication system 1 is, for example, an OFDM scheme.

When the mobile station apparatus 4 is linked via radio to one of the base station apparatuses in the mobile communication system 1, the control unit 455 retrieves the base station installation information from the storage unit 47. Then, the control unit 455 refers to the base station installation information and retrieves the identification information of the nearest neighbor base station apparatus in the mobile communication system 1 that is located nearest to the serving base station apparatus. The control unit 455 then passes the identification information to an uplink control unit 461 in the second transmission processing unit 46.

The second transmission processing unit 46 performs processing for uplink signal transmission in accordance with the protocol of the mobile communication system 1 during the period that the mobile station apparatus 4 is radio linked to any one of the base station apparatuses in the mobile communication system 1. For this purpose, the second transmission processing unit 46 includes the uplink control unit 461 and a modulating unit 462. These units constituting the second transmission processing unit 46 are identical in function to the corresponding units in the first transmission processing unit 44, except for differences that arise due to the difference in the protocol used. Therefore, the various units constituting the second transmission processing unit 46 will be described below by dealing only with the differences from the corresponding units in the first transmission processing unit 44.

The uplink control unit 461 applies transmission processing, such as error-correction coding, to the uplink data received from the application processing unit 48. Further, the uplink control unit 441 generates various kinds of uplink control signals including the signal reception quality information. The uplink control unit 461 further generates a control signal including the identification information of the nearest neighbor base station apparatus. Then, the uplink control unit 461 passes the thus processed uplink data and the control signals to the modulating unit 462.

The modulating unit 462 generates the uplink signal by multiplexing and modulating the uplink data and the control signals in accordance with a multiplexing scheme defined by the protocol of the mobile communication system 1. The multiplexing scheme here is, for example, an SC-FDMA scheme. The modulating unit 462 supplies the uplink signal to the radio processing unit 41.

The storage unit 47 includes, for example, an alterable nonvolatile semiconductor memory. The storage unit 47 stores various kinds of information, such as the identification information of the mobile station apparatus 4, that are used for controlling the radio connection with the base station apparatus. The storage unit 47 also stores the base station installation information. The storage unit 47 further stores various kinds of data and programs used by the application processing unit 48.

The application processing unit 48 executes various kinds of applications installed on the mobile station apparatus 4. Then, in accordance with the currently executing application, the application processing unit 48 recovers a voice signal or data signal from the downlink data received from the first reception processing unit 43 or the second reception processing unit 45. The application processing unit 48 reproduces the recovered voice signal through a speaker (not depicted) or displays the data signal on the display unit 49.

The application processing unit 48 generates uplink data by applying processing, such as information source coding, to a voice signal acquired through a microphone (not depicted) or a data signal entered from the operation unit 49. Then, the application processing unit 48 passes the uplink data to the first transmission processing unit 44 or the second transmission processing unit 46.

The operation unit 50 includes a user interface, such as a keypad or a touch panel, that the user uses to perform a desired operation on the mobile station apparatus 4. The operation unit 50 transfers the operation signal corresponding to the user operation to the application processing unit 48.

The display unit 49 includes a display such as a liquid crystal display or an organic EL display. The display unit 49 displays the data supplied from the application processing unit 48.

As has been described above, if the quality of the signal received by the mobile station apparatus from the serving base station apparatus drops to or below the first handover threshold for initiating a handover, the base station apparatus serving the mobile station apparatus does not immediately initiate the handover. Instead, the base station apparatus waits for a predetermined period of time to elapse, and then makes a decision as to whether the handover can be executed with another base station apparatus in the same mobile communication system as a handover target base station apparatus. If the quality of the signal received by the mobile station apparatus from that other base station apparatus is high enough for the handover to be initiated, then the handover is executed. In this way, the mobile communication system can increase the probability that if the mobile station apparatus has moved outside the communication area of one of the base station apparatuses in the mobile communication system, the handover will not be initiated until after the mobile station apparatus moves into the communication area of another one of the base station apparatuses in the mobile communication system. The mobile communication system can thus reduce the chance of a system handover.

Further, the base station apparatus can set the second handover threshold, with which the quality of the signal received by the mobile station apparatus from that other base station apparatus is compared, lower than the first handover threshold. Since this serves to increase the probability that the handover will be executed within the mobile communication system, the mobile communication system can further reduce the chance of a system handover.

Further, when the quality of the signal received from the base station apparatus serving the mobile station apparatus drops to or below the first handover threshold, the base station apparatus sets up a connection with the nearest neighbor base station apparatus before initiating the handover. As a result, when executing the handover, the mobile communication system need not perform processing for setting up the connection between the base station apparatuses, and therefore can reduce a delay that may occur at the time of the execution of the handover.

Figure 13:
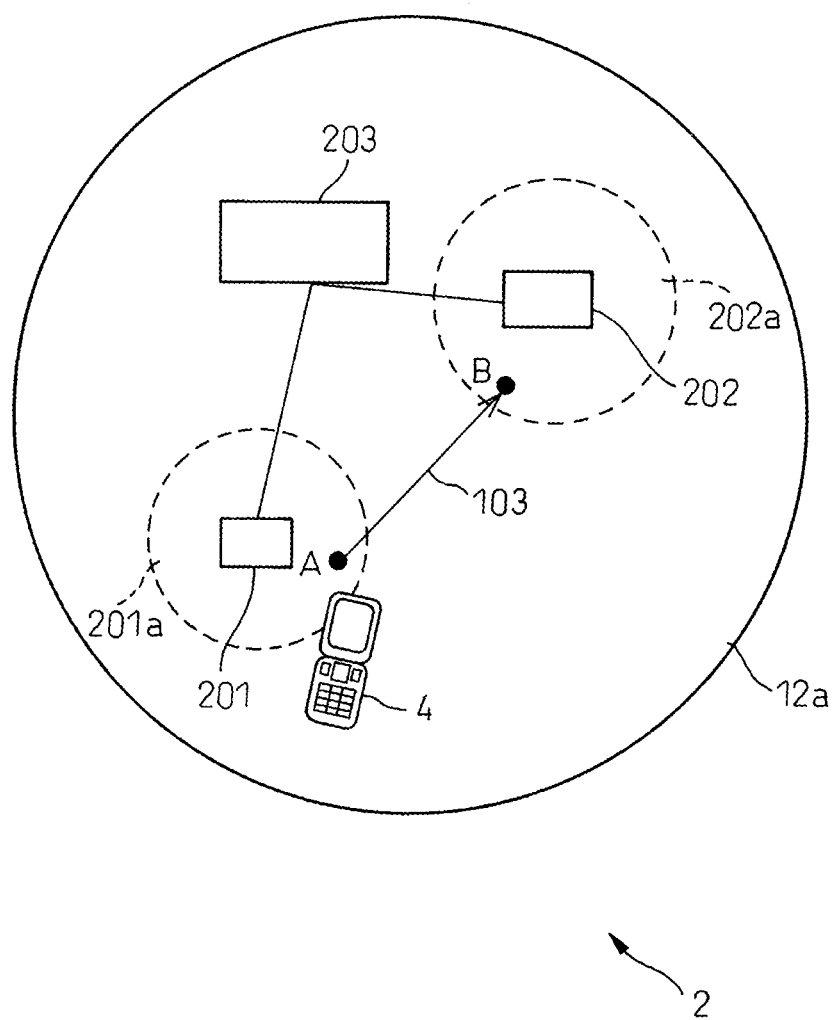
FIG. 13 is a diagram schematically illustrating the configuration of a base station apparatus in a mobile communication system according to an alternative embodiment.

The present invention is not limited to the above embodiment. FIG. 13 is a diagram schematically illustrating the configuration of a base station apparatus in a mobile communication system according to an alternative embodiment. As illustrated in FIG. 13, the base station apparatus 2 according to the alternative embodiment includes a plurality of slave apparatuses 201 and 202, each equipped, in addition to the antenna 22, with a circuit having the same function as the radio processing unit 21 of the base station apparatus illustrated in FIG. 10, and a master apparatus 203 having the other functions. The slave apparatuses 201 and 202 are each connected to the master apparatus 203 through a communication line. The communication areas 201a and 202a of the slave apparatuses 201 and 202 do not overlap each other and are contained in the communication area 12a of a base station apparatus belonging to another mobile communication system.

Suppose that the mobile base station apparatus 4 is initially located at point A within the communication area 201a of the slave apparatus 201 and is thus linked via radio to the base station apparatus 2. Also suppose that the mobile base station apparatus 4 thereafter moves to point B within the communication area 202a of the slave apparatus, as indicated by arrow 103. In this case, the mobile station apparatus 4 temporarily moves outside the communication area of the base station apparatus 2. In this embodiment also, if the quality of the signal received by the mobile station apparatus 4 from the base station apparatus 2 drops below the first handover threshold, the base station apparatus 2 does not immediately initiate the handover, but waits for a predetermined period of time to elapse and then makes a decision as to whether or not to execute the handover. In this embodiment, the installation information of each slave apparatus of the base station apparatus 2 is stored in the storage unit maintained in the master apparatus 203 of the base station apparatus 2. The installation information of each slave apparatus includes, for example, the identification information of the slave apparatus, the coordinates of the installation location, and the radius of the communication area.

Figure 14A:
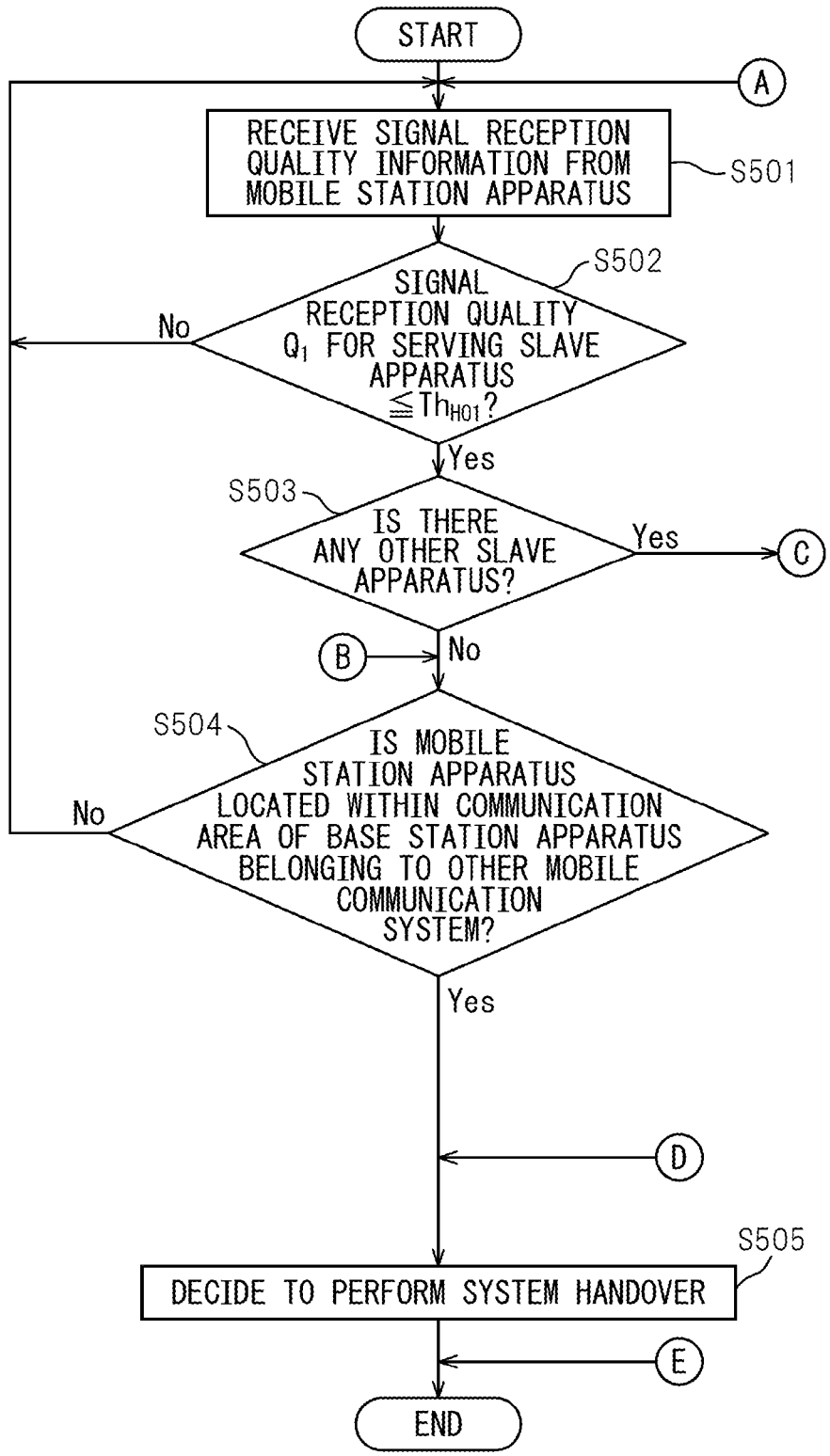
FIGS. 14A and 14B shows an operation flowchart illustrating a handover execution decision procedure which is performed at the base station apparatus according to the alternative embodiment.
Figure 14B:
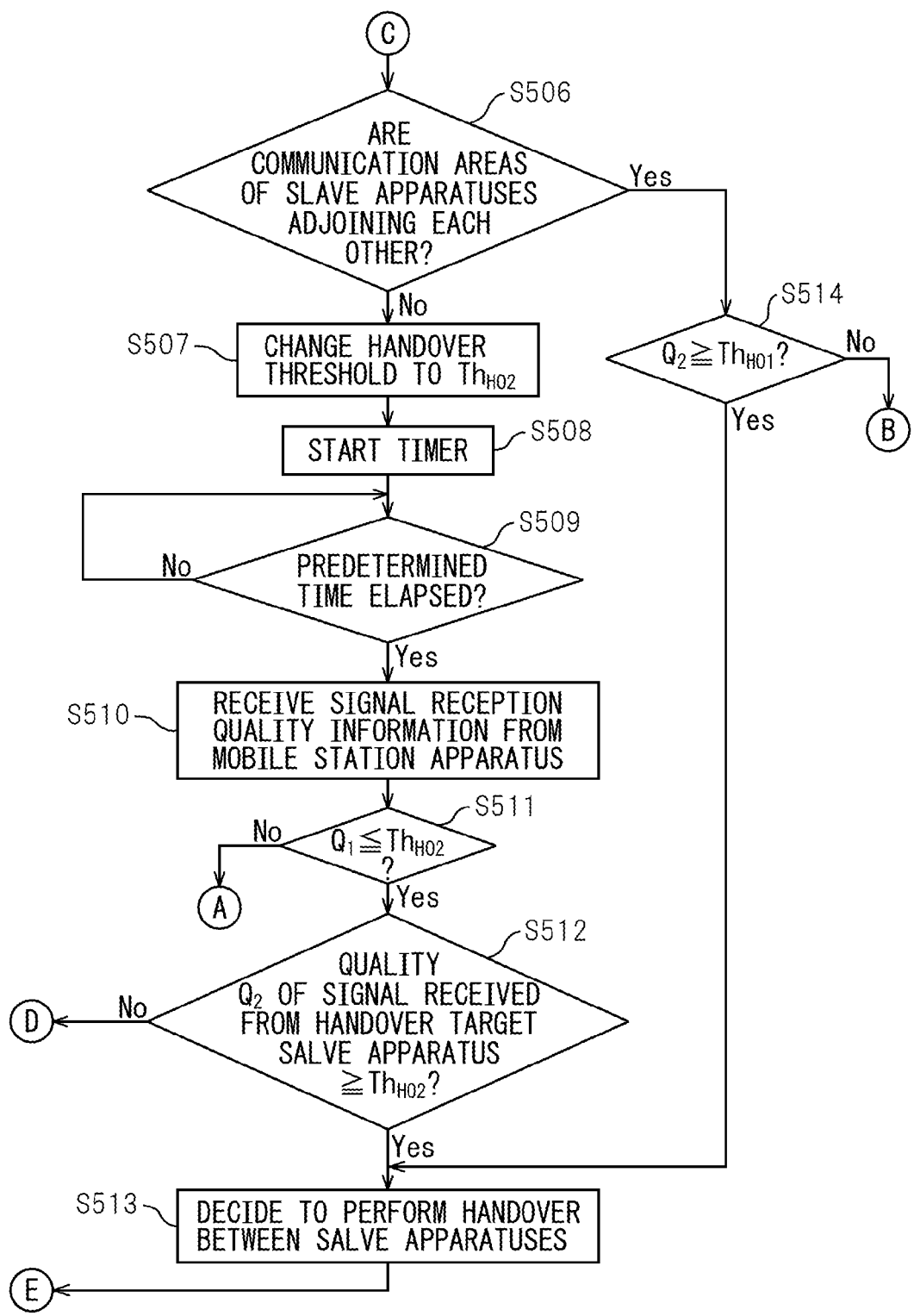

FIG. 14 is an operation flowchart illustrating a handover execution decision procedure which is performed at the base station apparatus 2 according to the alternative embodiment.

The base station apparatus 2 receives signal reception quality information from the mobile station apparatus 4 (step S501). By referring to the signal reception quality information, the base station apparatus 2 determines whether the signal reception quality $Q_1$ for the slave apparatus currently serving the mobile station apparatus 4 has dropped to or below the first handover threshold $Th_{HO1}$ (step S502).

If the signal reception quality $Q_1$ is higher than the first handover threshold $Th_{HO1}$ (No in step S502), the base station apparatus 2 need not execute handover. Therefore, the base station apparatus 2 returns to step S501 to repeat the above process.

On the other hand, if the signal reception quality $Q_1$ is equal to or lower than the first handover threshold $Th_{HO1}$ (Yes in step S502), the base station apparatus 2 refers to the slave apparatus installation information to see whether there is any other slave apparatus to the base station apparatus 2 (step S503).

If there is no such slave apparatus (No in step S503), the base station apparatus 2 proceeds to determine whether the mobile station apparatus 4 is located within the communication area of the base station apparatus belonging to the other mobile communication system (step S504). To make this determination, the mobile station apparatus 4, for example, measures the quality of the signal received from the base station apparatus belonging to the other mobile communication system and transmits the result of the measurement to the base station apparatus 2. Then, if the quality of the signal received from the base station apparatus belonging to the other mobile communication system is higher than the first handover threshold $Th_{HO1}$, the base station apparatus 2 can determine that the mobile station apparatus 4 is located within the communication area of the base station apparatus belonging to the other mobile communication system.

If the mobile station apparatus 4 is not located within the communication area of the base station apparatus belonging to the other mobile communication system (No in step S504), there is no handover candidate base station apparatus in the neighborhood of the mobile station apparatus 4. Therefore, the base station apparatus 2 returns to step S501 to repeat the above process. In this process, if the quality of the signal being received by the mobile station apparatus 4 from the base station apparatus 2 drops to a level at which the radio connection can no longer be maintained, the mobile station apparatus 4 is disconnected from any landline apparatus in the mobile communication system 1.

On the other hand, if the mobile station apparatus 4 is located within the communication area of the base station apparatus belonging to the other mobile communication system (Yes in step S504), the base station apparatus 2 decides to perform a system handover (step S505).

If the base station apparatus 2 has another slave apparatus (Yes in step S503), the base station apparatus 2 determines whether the communication area of the slave apparatus currently serving the mobile station apparatus 4 adjoins the communication area of that other slave apparatus (step S506). If the communication areas of the slave apparatuses are not adjoining each other (No in step S506), the base station apparatus 2 changes the handover threshold to the second handover threshold $Th_{HO2}$ (step S507). The base station apparatus 2 starts its internal timer (step S508). Then, the base station apparatus 2 determines whether a predetermined period of time has elapsed after starting the timer (step S509).

If the predetermined period of time has not yet elapsed after starting the timer (No in step S509), the base station apparatus 2 repeats the process of step S509. When the predetermined period of time has elapsed after starting the timer (Yes in step S509), the base station apparatus 2 once again receives the signal reception quality information from the mobile station apparatus 4 (step S510).

The base station apparatus 2 determines whether the quality $Q_1$ of the signal received by the mobile station apparatus 4 from the serving slave apparatus has dropped to or below the second handover threshold $Th_{HO2}$ (step S511). If the signal reception quality $Q_1$ is higher than the second handover threshold $Th_{HO2}$ (No in step S511), the base station apparatus 2 does not perform handover, but repeats the process starting from step S501.

On the other hand, if the signal reception quality $Q_1$ is equal to or lower than the second handover threshold $Th_{HO2}$ (Yes in step S511), the base station apparatus 2 determines whether or not the quality $Q_2$ of the signal received by the mobile station apparatus 4 from the handover target slave apparatus is equal to or higher than the second handover threshold $Th_{HO2}$ (step S512).

If the signal reception quality $Q_2$ is lower than the second handover threshold $Th_{HO2}$ (No in step S512), the base station apparatus 2 performs a system handover (step S505). On the other hand, if the signal reception quality $Q_2$ is equal to or higher than the second handover threshold $Th_{HO2}$ (Yes in step S512), the base station apparatus 2 decides to perform a handover between the slave apparatuses (step S513).

If the communication areas of the slave apparatuses are adjoining each other (Yes in step S506), the base station apparatus 2 determines whether or not the quality $Q_2$ of the signal received by the mobile station apparatus 4 from the handover target slave apparatus is equal to or higher than the first handover threshold $Th_{HO1}$ (step S514). If the signal reception quality $Q_2$ is equal to or higher than the first handover threshold $Th_{HO1}$ (Yes in step S514), the base station apparatus 2 decides to perform a handover between the slave apparatuses (step S513). On the other hand, if the signal reception quality $Q_2$ is lower than the first handover threshold $Th_{HO1}$ (No in step S514), the base station apparatus 2 repeats the process of step S504.

After step S505 or step S513, the mobile communication system 1 proceeds to carry out a handover or a system handover, whichever is selected.

The base station installation information is not limited to the above example. According to another example, the base station installation information may include, for each base station apparatus, the identification information of every base station that belongs to the mobile communication system 1 and that is located within a prescribed distance of the base station apparatus. The base station installation information may further include the distance from the base station apparatus to each base station that belongs to the mobile communication system 1 and that is located within the prescribed distance. The prescribed distance, for example, is set equal to the maximum base station distance within the range of which a handover can be performed within the mobile communication system 1 in accordance with the operation flow depicted in FIG. 9.

When the base station installation information includes the distance from one base station apparatus to another base station apparatus, the mobile station apparatus may determine the nearest neighbor base station apparatus by referring to the base station installation information and selecting the base station apparatus that is closest in distance to the serving base station apparatus. In the following, the base station apparatus currently serving the mobile station apparatus is referred to as the source base station apparatus. In this case, the mobile station apparatus may notify the source base station apparatus of the distance to the nearest neighbor base station apparatus. Then, the source base station apparatus may set the predetermine period of time, which is used in step S409 in the operation flowchart of FIG. 9, in accordance with the distance to the nearest neighbor base station apparatus. For example, the source base station apparatus can set the predetermine period of time longer as the distance to the nearest neighbor base station apparatus becomes longer. In this way, the source base station apparatus can appropriately determine the handover decision timing.

Further, when the base station installation information includes the identification information of each base station apparatus located within the prescribed distance, the mobile station apparatus may identify each base station apparatus located within the prescribed distance of the serving base station apparatus by referring to the base station installation information.

The mobile station apparatus, for example, in step S107 in the operation sequence depicted in FIG. 4, transmits the identification information of each base station apparatus located within the prescribed distance of the source base station apparatus. Further, the mobile station apparatus may measure only the signal reception quality for each base station apparatus located within the prescribed distance of the source base station apparatus and may report only the thus measured signal reception quality to the source base station apparatus.

Thereafter, when performing the handover execution decision procedure depicted in FIG. 9, the source base station apparatus may set up, in step S408, a connection with each base station apparatus located within the prescribed distance of the source base station apparatus. Further, in step S412, the source base station apparatus may select the base station apparatus that provides the best signal reception quality from among the base station apparatuses located within the prescribed distance of the source base station apparatus, and may compare that signal reception quality with the second handover threshold. If the best signal reception quality is equal to or higher than the second handover threshold, the source base station apparatus selects the base station apparatus that provides the best signal reception quality as the handover target base station apparatus, and carries out the handover process.

The base station installation information may be held in the upper node apparatus belonging to the mobile communication system 1. In this case, when any particular base station apparatus in the mobile communication system 1 is powered up, the base station installation information may be transmitted from the upper node apparatus to that particular base station apparatus. In this case, each time a new base station apparatus is installed in the mobile communication system 1, the newly installed base station apparatus may transmits its identification information and installation location information to the upper node apparatus. Then, based on the installation location information supplied from the newly installed base station apparatus, the upper node apparatus obtains the distance to each of the other base station apparatuses, and updates the base station installation information by determining the nearest neighbor base station apparatus for each base station apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication system comprising:
   an upper node apparatus;
   a plurality of base station apparatuses connected to the upper node apparatus; and
   a mobile station apparatus capable of connecting via radio to any one of the plurality of base station apparatuses, wherein
   the mobile station apparatus measures at predetermined intervals of time the quality of a signal received from each of the plurality of base station apparatuses and, each time the quality of the received signal is measured, transmits signal reception quality information indicating the quality of the signal received from each base station apparatus to a first base station apparatus of the plurality of base station apparatuses that is currently connected via radio to the mobile station apparatus, and
   after a predetermined period of time has elapsed from the time at which the signal reception quality for the first base station apparatus dropped to or below a first handover threshold, if the quality of the signal received from a second base station apparatus of the plurality of base station apparatuses that is different from the first base station apparatus becomes equal to or higher than a second handover threshold, the first base station apparatus executes a handover to switch the radio connection of the mobile station apparatus from the first base station apparatus to the second base station apparatus, and wherein a communication area of the first base station apparatus and a communication area of the second base station do not overlap each other and, as the distance between the first base station apparatus and the second base station apparatus is increased, the predetermined period of time is increased.

2. The mobile communication system according to claim 1, wherein the second handover threshold is lower than the first handover threshold.

3. The mobile communication system according to claim 2, wherein if the quality of the signal received from the second base station apparatus after the predetermined period of time elapses is higher than the quality of the signal received from the second base station apparatus before the predetermined period of time has elapsed, the first base station apparatus executes a handover to switch the radio connection of the mobile station apparatus from the first base station apparatus to the second base station apparatus.

4. The mobile communication system according to claim 1, wherein the plurality of base station apparatuses are capable of communicating with each other without intervention of the upper node apparatus, and wherein the first base station apparatus sets up a connection with the second base station apparatus before the predetermined period of time elapses from the time at which the signal reception quality for the first base station apparatus has dropped to or below the first handover threshold.

5. The mobile communication system according to claim 1, wherein the second base station apparatus is the base station apparatus among the plurality of base station apparatuses that is located nearest to the first base station apparatus.

6. The mobile communication system according to claim 5, wherein the mobile station apparatus is capable of connecting via radio to a base station apparatus that does not belong to the mobile communication system but belongs to a dissimilar mobile communication system, and wherein during the period that the mobile station apparatus is connected via radio to the base station apparatus belonging to the dissimilar mobile communication system, the mobile station apparatus acquires, from the base station apparatus belonging to the dissimilar mobile communication system, base station installation information which carries the identification information of any one of the plurality of base station apparatuses that has a communication area overlapping with the communication area of the base station apparatus belonging to the dissimilar mobile communication system, and which also carries information about distances between the base station apparatuses, and thereafter, when the mobile station apparatus is connected via radio to the first base station apparatus, the mobile station apparatus selects, as the second base station apparatus, the base station apparatus located nearest to the first base station apparatus by referring to the base station installation information, and transmits the identification information of the second base station apparatus to the first base station apparatus.

7. The mobile communication system according to claim 1, wherein after the predetermined period of time has elapsed, if the signal reception quality for the second base station apparatus is lower than the second handover threshold, and if the mobile station apparatus is located within the communication area of a base station apparatus belonging to a dissimilar mobile communication system, the first base station apparatus instructs the mobile station apparatus to set up a radio connection to the base station apparatus belonging to the dissimilar mobile communication system.

8. A base station apparatus capable of connecting via radio to a mobile station apparatus, comprising:
   a radio processing unit configured to receives from the mobile station apparatus, at predetermined intervals of time, signal reception quality information indicating the quality of signals that the mobile station apparatus received from the base station apparatus and another base station apparatus, respectively; and
   a handover decision unit configured to compares a first signal reception quality carried in the signal reception quality information for the base station apparatus with a first handover threshold to measure a period of time that elapses after the first signal reception quality has dropped to or below the first handover threshold wherein the handover decision unit, after the measured period of time has reached a predetermined period of time, if a second signal reception quality for the other base station apparatus becomes equal to or higher than the second handover threshold, then decides to switch the radio connection of the mobile station apparatus from the base station apparatus to the other base station apparatus.

* * * * *